US012598600B2

(12) United States Patent
Kak et al.

(10) Patent No.: US 12,598,600 B2
(45) Date of Patent: Apr. 7, 2026

(54) XAPP CONFLICT MITIGATION FRAMEWORK

(71) Applicant: Nokia Solutions and Networks Oy, Espoo (FI)

(72) Inventors: Ahan Kak, Murray Hill, NJ (US); Heba Abdeen, Nozay (FR); Gopalasingham Aravinthan, Massy (FR); Nakjung Choi, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/581,672

(22) Filed: Feb. 20, 2024

(65) Prior Publication Data

US 2024/0284436 A1      Aug. 22, 2024

(30) Foreign Application Priority Data

Feb. 20, 2023    (FI) ..................................... 20235210

(51) Int. Cl.
*H04W 72/12*       (2023.01)
*H04W 24/02*       (2009.01)
*H04W 72/0446*     (2023.01)

(52) U.S. Cl.
CPC ........... *H04W 72/12* (2013.01); *H04W 24/02* (2013.01); *H04W 72/0446* (2013.01)

(58) Field of Classification Search
None
See application file for complete search history.

(56) References Cited

U.S. PATENT DOCUMENTS

2022/0046482 A1    2/2022  Cui et al.
2022/0283832 A1    9/2022  Singh et al.
(Continued)

FOREIGN PATENT DOCUMENTS

CN        113347609 A    9/2021
CN        114449459 A    5/2022
(Continued)

OTHER PUBLICATIONS

"Transforming Radio Access Networks Towards Open, Intelligent, Virtualized and Fully Interoperable RAN", O-Ran Alliance, Retrieved on Feb. 20, 2024, Webpage available at : https://www.o-ran.org/.
(Continued)

*Primary Examiner* — Faruk Hamza
*Assistant Examiner* — Cassandra L Decker
(74) *Attorney, Agent, or Firm* — Nokia Technologies Oy

(57)              ABSTRACT

According to an aspect, there is provided an apparatus configured to perform the following. The apparatus hosts a plurality of applications for managing network functions of a radio access network and schedules them for one or more future time slots. The apparatus obtains one or more predicted future values of one or more network parameters of the radio access network for the one or more future time slots. The apparatus determines whether or not at least one conflict exists in the scheduling of the plurality of applications based on the one or more predicted future values of the one or more network parameters. In response to determining that the at least one conflict exists, the apparatus resolves the at least one conflict by adjusting scheduling of at least one application involved in the at least one conflict.

19 Claims, 10 Drawing Sheets

(56) References Cited

U.S. PATENT DOCUMENTS

| | | | | |
|---|---|---|---|---|
| 2023/0209370 A1* | 6/2023 | Pateromichelakis | .. | G06N 20/00 |
| | | | | 370/328 |
| 2023/0328580 A1* | 10/2023 | Pateromichelakis | | ....................... |
| | | | | H04W 28/0268 |
| | | | | 370/328 |

FOREIGN PATENT DOCUMENTS

| | | | | | |
|---|---|---|---|---|---|
| CN | 114697998 | A | 7/2022 | | |
| CN | 115699962 | A | 2/2023 | | |
| EP | 2837225 | B1 | 10/2020 | | |
| EP | 3855839 | A1 | 7/2021 | | |
| WO | 2013/152787 | A1 | 10/2013 | | |
| WO | 2021/249637 | A1 | 12/2021 | | |
| WO | 2022/094224 | A1 | 5/2022 | | |
| WO | 2022/182396 | A1 | 9/2022 | | |
| WO | 2023/283192 | A1 | 1/2023 | | |
| WO | WO-2023172292 | A2 * | 9/2023 | ............ | H04W 16/02 |

OTHER PUBLICATIONS

Bonati et al., "Open, Programmable, and Virtualized 5G Networks: State-of-the-Art and the Road Ahead", Computer Networks, vol. 182, Dec. 9, 2020, pp. 1-28.
Polese et al., "Understanding O-RAN : Architecture, Interfaces, Algorithms, Security, and Research Challenges", arXiv, Aug. 1, 2022, pp. 1-33.
D'oro et al., "dApps: Distributed Applications for Real-time Inference and Control in O-Ran", IEEE Communications Magazine, vol. 60, No. 11, Nov. 2022, pp. 52-58.
Navabi et al., "Predicting Wireless Channel Features Using Neural Networks", IEEE International Conference on Communications (ICC), May 20-24, 2018, 6 pages.
Jeong et al., "Mobility Prediction for 5G Core Networks", vol. 5, No. 1, Mar. 2021, pp. 56-61.
Lateef et al., "LTE-advanced self-organizing network conflicts and coordination algorithms", IEEE Wireless Communications, vol. 22, No. 3, Jun. 2015, pp. 108-117.
Rivera et al., "Multi-Agent Team Learning in Virtualized Open Radio Access Networks (O-RAN)", Sensors, vol. 22, No. 14, pp. 1-13.
Dryjański et al., "Toward Modular and Flexible Open RAN Implementations in 6G Networks: Traffic Steering Use Case and O-RAN xApps", Sensors, vol. 21, No. 24, 2021, pp. 1-14.

Schmelz et al., "A Coordination Framework for Self-Organisation in LTE Networks", 12th IFIP/IEEE International Symposium on Integrated Network Management (IM 2011) and Workshops, May 23-27, 2011, 8 pages.
Mwanje et al., "Cognitive Autonomy for Network Configuration", Nokia Bell Labs, 2020, pp. 255-300.
Bandh, "Coordination of autonomic function execution in Self-Organizing Networks", Dissertation, Apr. 2013, 251 pages.
Bandh et al., "Policy-based coordination and management of SON functions", 12th IFIP/IEEE International Symposium on Integrated Network Management (IM 2011) and Workshops, May 23-27, 2011, pp. 827-840.
Bandh et al., "Chapter 9 SON operation", Wiley, 2011, 36 pages.
"Policy-based management", Wikipedia, Retrieved on Feb. 20, 2024, Webpage available at : https://en.wikipedia.org/wiki/Policy-based_management.
Office action received for corresponding Finnish Application No. 20235210, dated Aug. 14, 2023, 14 pages.
"O-RAN Working Group 3 (Near-Real-time RAN Intelligent Controller and E2 Interface Workgroup) Near-RT RIC Architecture", O-Ran Alliance, O-RAN.WG3.RICARCH-v03.00, 2022, pp. 1-104.
"O-RAN Working Group 2 (Non-RT RIC and A1 interface WG) A1 interface: General Aspects and Principles", O-Ran Alliance, O-RAN.WG2.A1GAP-v03.00, 2022, pp. 1-21.
Office action received for corresponding Finnish Application No. 20235210, dated Jan. 22, 2024, 11 pages.
Finnish Patent and Registration Office Search Report for corresponding Finnish Application No. 20235210, dated Aug. 14, 2023, 2 pages.
Extended European Search Report received for corresponding European Patent Application No. 24158312.9, dated Jul. 3, 2024, 11 pages.
Office action received for corresponding Chinese Patent Application No. 202410189883.9, dated Mar. 4, 2025, 11 pages of office action and 9 pages of translation & summary available.
Eskandari et al., "Smart Interference Management xApp using Deep Reinforcement Learning", arXiv, Apr. 12, 2022, pp. 1-7.
Office action received for corresponding Chinese Patent Application No. 202410189883.9, dated Jul. 23, 2025, 8 pages of office action and 11 pages of translation & summary available.
Rejection Decision received for corresponding Chinese Patent Application No. 202410189883.9, dated Sep. 30, 2025, 9 pages of Rejection Decision and 7 pages of translation available.

* cited by examiner

XAPP CONFLICT MITIGATION FRAMEWORK

TECHNICAL FIELD

Various example embodiments relate to wireless communications.

BACKGROUND

Open radio access network (O-RAN) is an ongoing shift in mobile network architectures that enables service provider to use non-proprietary subcomponents from a variety of vendors. An Open RAN is made possible by a set of industry-wide standards that telecom suppliers can follow when producing related equipment. Open RAN enables programmable, intelligent, disaggregated, virtualized, and interoperable functions. A part of the O-RAN concept is the so-called xApps which are independent software plug-ins to the near-real-time (near-RT) radio access network interface controller (RIC) platform to provide functional extensibility to the RAN by third parties. One or more xApps may be activate in the Near-RT RIC at any instant of time which may lead to conflicts between different xApps with respect to, e.g., their targeted key performance indicators (KPIs) and/or optimization parameters.

BRIEF DESCRIPTION

According to an aspect, there is provided an apparatus comprising: at least one processor; and at least one memory storing instructions that, when executed by the at least one processor, cause the apparatus at least to perform: hosting a plurality of applications for managing network functions of a radio access network; scheduling the plurality of applications for one or more future time slots; obtaining one or more predicted future values of one or more network parameters of the radio access network for the one or more future time slots; determining whether or not at least one conflict exists in the scheduling of the plurality of applications based on the one or more predicted future values of the one or more network parameters; and in response to determining that the at least one conflict exists, resolving the at least one conflict by adjusting scheduling of at least one application involved in the at least one conflict.

Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Embodiments and examples described herein may be implemented in any communications system comprising wireless connection(s). In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, substantially the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
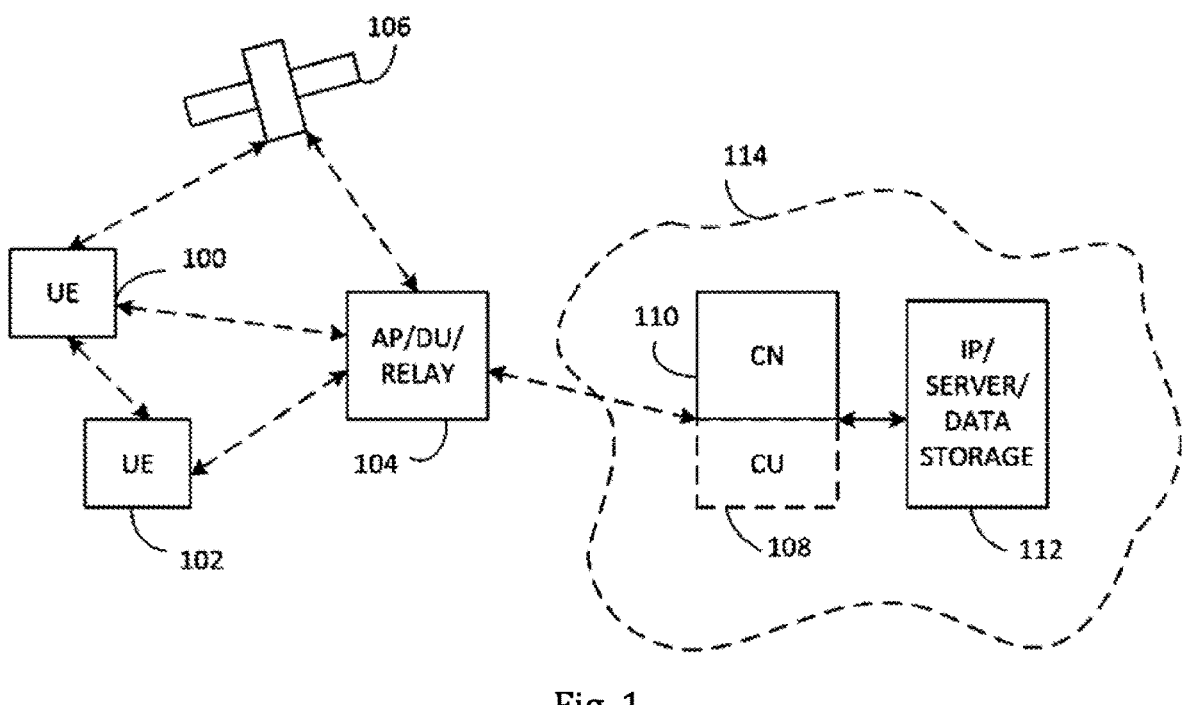
FIG. 1 illustrates an exemplified wireless communication system.

FIG. 1 depicts examples of simplified system architectures showing some elements and functional entities, some or all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network which is a scenario in which objects are provided with the ability to transfer data over a network without needing human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems.

Examples of mobile physical systems include mobile robotics and electronics transported by humans or animals.

It should be understood that, in FIG. 1, user devices are depicted to include 2 antennas for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different needs on latency, reliability, throughput and mobility.

The current architecture in LTE networks is fully distributed in the radio and fully centralized in the core network. The low latency applications and services in 5G need to bring the content close to the radio which leads to local break out and multi-access edge computing (MEC). 5G enables analytics and knowledge generation to occur at the source of the data. This approach needs leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). At least one satellite 106 in the megaconstellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

The embodiments to be discussed below may be applicable, in particular, to an open RAN (O-RAN) architecture. O-RAN is an ongoing shift in mobile network architectures that enables service providers the use of non-proprietary subcomponents from a variety of vendors. An Open RAN is made possible by a set of industry-wide standards that telecom suppliers can follow when producing related equipment. Open RAN enables programmable, intelligent, disaggregated, virtualized, and interoperable functions.

Figure 2:
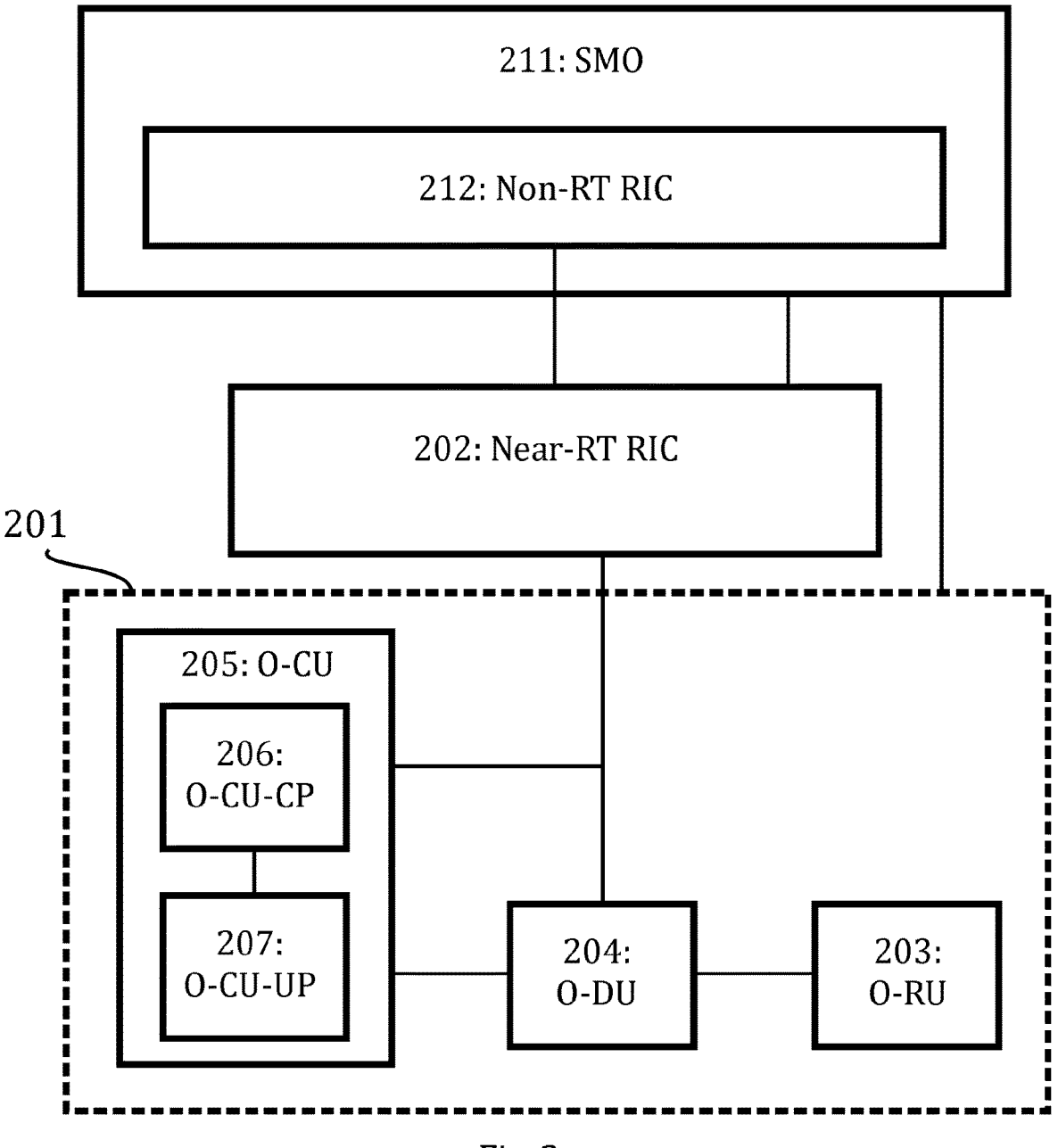
FIG. 2 illustrates an exemplified O-RAN architecture.

FIG. 2 illustrates an exemplary O-RAN architecture to which may be embodiments in connection with embodiments. The O-RAN architecture of FIG. 2 may form part of the wireless communication system of FIG. 1. Thus, any of the definitions provided in connection with FIG. 1 may apply, mutatis mutandis, for FIG. 2.

The system of FIG. 2 comprises a distributed access node 201 (e.g., a gNB or an eNB), a near-real-time RAN intelligent controller (near-RT RIC) 202 and a service management & orchestration framework (SMO) 211. The SMO 211 comprises at least a non-real-time RAN intelligent controller (non-RT RIC) 212. The SMO 211 may, in general, comprise one or more separate devices (e.g., servers or other computing devices). The SMO 211 may be connected to the near-RT RIC 202 and/or the distributed access node 201 at least via an O1 interface.

Similar to as discussed in connection with FIG. 1, in the O-RAN architecture of FIG. 2, the distributed access node 201 (e.g., a gNB or an eNB) is split or disaggregated into multiple different units. Namely, the distributed access node 201 of FIG. 2 comprises a radio unit (RU) 203, a distributed unit (DU) 204 and a central (or centralized) unit (CU) 205. The RU 203, the DU 204, the CU 205 and the CU-CP 206 may be called, in the context of the O-RAN framework, the open radio unit (O-RU), the open distributed unit (0-DU) and the open central unit (O-CU), respectively. The RU 203 may be defined as a logical node hosting Low-physical (PHY) layer and radio frequency (RF) processing based on a lower layer functional split. The DU 204 may be defined as a logical node hosting radio link control (RLC), medium access control (MAC) and High-PHY layers based on a lower layer functional split. The CU 205 may be defined as a logical node hosting the radio resource control (RRC), the service data adaptation protocol (SDAP) and the packet data convergence protocol (PDCP). While FIG. 2 shows only a single RU 203 and a single DU, in general, the distributed access node 201 may comprise multiple RUs and/or multiple DUs.

The CU 204 is further divided into a control plane CU entity (CU-CP) 206 and a user plane CU entity (CU-UP) 207. The CU-CP 206 and the CU-UP 207 may be called, in the context of the O-RAN framework, the open control plane CU entity (0-CU-CP) and an open user plane CU entity (O-CU-UP), respectively. The CU-CP entity 206 may be defined as a logical node hosting the radio resource control (RRC) and the control plane part of the packet data convergence protocol (PDCP). The CU-UP entity 207 may be defined as a logical node hosting the RRC protocol, the service data adaptation protocol (SDAP) and the PDCP (or at least the user-plane part thereof).

The O-RAN architecture may employ a split 7—2x for the DU/RU split (amongst others), in which coding, modulation and mapping to resource elements are performed in the DU, and the inverse FFT (Fast Fourier Transform), the cyclic prefix addition and digital to analog conversion are carried out in the RU 203. The precoding may be done in either of the two.

The distributed access node 201 of FIG. 2 is communicatively connected to the near-RT RIC 202. The near-RT RIC 202 may be defined as a logical function that enables near-real-time control and optimization of O-RAN elements and resources via fine-grained data collection and actions over E2 interface. The near-RT RIC 202 may be configured to control the primitives for the RAN (e.g., mobility management and interference management).

Moreover, the near-RT RIC 202 is configured to host different (control) applications for value added services (so-called xApps). XApps are independent software plug-ins to the near-RT RIC 202 for providing functional extensibility to the RAN especially by third parties. In other words, xApps are network control algorithms for managing and optimizing the RAN using the logically centralized and intelligent control plane (i.e., using the near-RT RIC 202 as well as the non-RT RIC 212 connected thereto) during the network operation.

Examples of xApps which may be hosted in the near-RT RIC 202 include coverage and capacity optimization (CCO), mobility load balancing (MLB), mobility robustness optimization (MRO), cell outage compensation (COC), physical cell identity (PCI), radio resource allocation (RRA), energy efficiency (EE), remote electrical tilt and transmission power (RET & TxP), inter-cell interference coordination (ICIC), automatic neighbor relation (ANR), power allocation (PA) and conflict relating to addition and/or removal of one or more access nodes (e.g., gNBs) and/or one or more relay nodes. In some cases, multiple instances of the same xApp may be run at the same time.

As mentioned above, the near-RT RIC 202 may be connected with the DU(s) 204 and CU 205 of the distributed access node 201 via the E2 interface and the associated E2AP (E2 application protocol). The E2 interface may be defined as the SouthBound (SB) interface used by the near-RT RIC 202 for controlling the underlying RAN elements. A requirement of the E2 interface is that it is able to connect the near-RT RIC 202 to different types of RAN elements. This range is reflected in the application programming interface (API), which revolves around a service model abstraction. The idea is that each RAN element advertises a service model, which effectively defines the set of RAN Functions the element is able to support. The near-RT RIC 202 may then issue one of the following four operations or a combination thereof against this service model:

Report: the near-RT RIC 202 asks the element to report a function-specific value setting.

Insert: the near-RT RIC 202 instructs the element to activate a user plane function.

Control: the near-RT RIC 202 instructs the element to activate a control plane function.

Policy: the near-RT RIC 202 sets a policy parameter on one of the activated functions.

The near-RT RIC 202 operates in communication and collaboration with the non-RT RIC 212 of the SMO 211. The non-RT RIC 212 is configured to perform non-real-time control and optimization of the usage of RAN elements and resources. The non-RT RIC 212 may be configured to train (and update) various AI (artificial Intelligence) and ML (machine learning) models which are subsequently used by the near-RT RIC 202. Also, the non-RT RIC 212 may be configured to enforce policy-based guidance of applications and/or features in the near-RT RIC 202, especially in cases where the near real-time policies generated by the near-RT RIC 202 fail to meet the performance requirements of the RAN. The non-RT RIC 212 may be configured, for example, to perform provision management, perform fault supervision, implement performance assurance services, perform traces collection, start up, register, and update physical equipment, and/or manage communication surveillance services. The non-RT RIC 212 and the near-RT RIC 202 may be connected via the AI interface.

The non-RT RIC 212 may operate in time orders larger than 1 second (e.g., in a time order of minutes or hours). In other words, the non-RT RIC 212 may be able deploy xApps whose time budget exceeds 1 second. On the other hand, the near-RT RIC 202 may operate in time orders from 10 ms to 1 s. Thus, while there is an inherent delay in the operation of the near-RT RIC 202 (hence the term "near-RT"), this delay is still significantly smaller than the delay for the non-RT RIC 212.

In addition to the non-RT RIC 212, the SMO 211 may comprise, for example, design, inventory, policy and/or configuration entities or units (not shown in FIG. 2). Moreover, the SMO 211 may be connected, via an O2 interface, to an infrastructure management framework (also not shown in FIG. 2).

Since a given mobile network may be highly dynamic with a variety of different use cases and diverse QoS requirements, it is often very challenging for the operator to choose the appropriate xApp for maximizing the QoS while maintaining the required KPIs. It is very likely that there will be more than one xApp active in the near-RT RIC at any given time. It is, then, also highly possible that there exists a conflict between different xApps with respect to their targeted KPIs, optimization parameters or other parameters associated with the xApps.

For example, the xApp for coverage and capacity optimization (CCO) and the xApp for inter/intra cell interference control (ICIC), if running at the same time, may have a conflict with respect to their targeted KPIs such as coverage and interference control. The CCO may, e.g., want to increase the coverage by paying the penalty of an increase in interference while the ICIC may want to reduce the interference by paying the penalty of a reduction in coverage. Such conflicts can significantly degrade the overall performance of the mobile network.

The embodiments to be discussed below seek to overcome or at least alleviate the problems described above by implementing a conflict resolution scheme in the near-RT RIC. At least some of the embodiments provide conflict mitigation in O-RAN for ensuring that any xApp conflict is resolved without any service level agreement (SLA) violation penalty so that the overall QoS is maintained.

Figure 3:
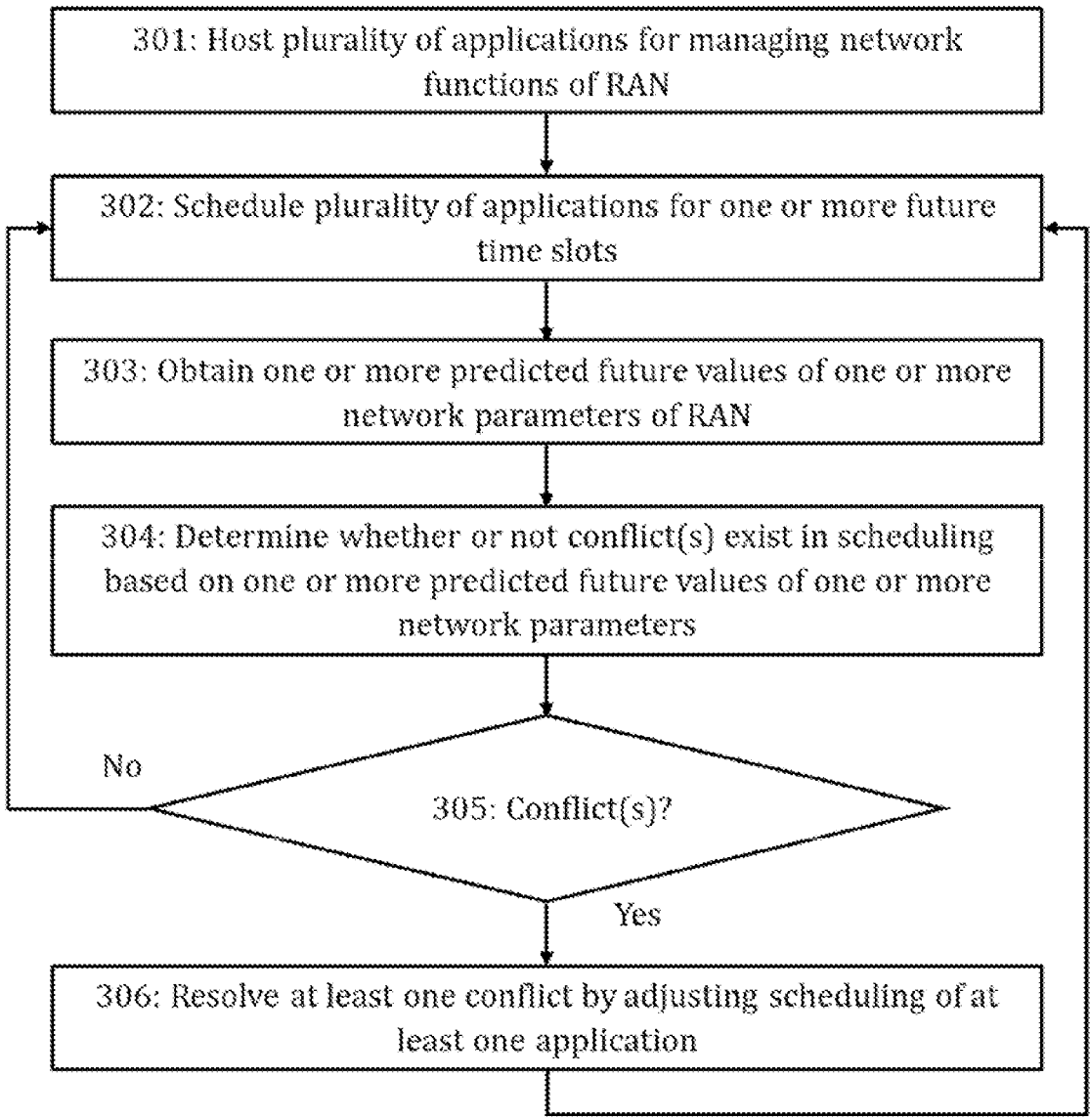
FIGS. 3 to 4 illustrate exemplary processes according to embodiments.

FIG. 3 illustrates a process according to embodiments for performing conflict resolution. The illustrated process may be performed by an apparatus (e.g., a computing device). The apparatus may form a part of an O-RAN architecture or other similar RAN architecture supporting third-party applications for value-added services. The apparatus may be a near-RT RIC or form a part of a near-RT RIC. Alternatively, the apparatus may be an apparatus (e.g., a computing device) communicatively connected to the near-RT RIC. The near-RT RIC may be, for example, the near-RT RIC 202 of FIG. 2.

Referring to FIG. 3, the apparatus hosts, in block 301, a plurality of applications for managing network functions of a radio access network. The plurality of applications may be applications for providing value-added services. The plurality of applications may comprise only third-party applications or at least one third-party application. The plurality of application may be maintained in at least one database of the apparatus.

In some embodiments, the plurality of applications may be xApps. Said xApps may be, e.g., of any of the types described in connection with FIG. 2.

The apparatus schedules, in block 302, the plurality of applications (or at least some of them) for one or more future time slots. The one or more future time slot may be consecutive time slots. Each time slot may have the same length (e.g., 10 ms). For example, the one or more future time slots may comprise or consist of time slots t=10, 20, 30, . . . , 100 ms, where t corresponds to the time following the present time. The scheduling of block 302 (and thus also actions relating to the following blocks 303 to 307) may be repeated periodically or regularly.

The apparatus obtains, in block 303, one or more predicted future values of one or more network parameters of the radio access network for the one or more future time slots. One or more predicted future values corresponding to respective one or more future time slots may be provided for each of the one or more network parameters. The predicted future values of the one or more network parameters may be obtained, for example, by the apparatus calculating said values using a dedicated machine-learning model which has been previously trained by the non-RT RIC, as will be described below in further detail in connection with FIG. 4. The machine-learning-based prediction may be performed based on one or more recent (measured) values for one or more cell and/or user parameters measurable in the radio access network. Alternatively, the predicted future values of the one or more network parameters may be obtained (or received) from another device (which may form a part of the near-RT RIC or be communicatively connected thereto).

The one or more network parameters of the radio access network may relate to a serving cell and/or to one or more neighboring cells (that is, neighboring relative to the serving cell). Additionally or alternatively, at least some of the one or more network parameters may be defined per terminal device (i.e., they may be terminal device specific).

In some embodiments, the one or more network parameters of the radio access network of block 303 may comprise at least one of:
   number of terminal devices in a serving cell,
   number of terminal devices in one or more neighboring cells,
   a quality of service (QoS) of one or more terminal devices in the serving cell,
   a QoS of one or more terminal devices in one or more neighboring cells, a downlink bit rate of one or more terminal devices in the serving cell,
   an uplink bit rate of one or more terminal devices in the serving cell,
   a cell individual offset (CIO) for the serving cell,
   a CIO for one or more neighboring cells,
   a hysteresis (or a hysteresis margin) associated with one or more terminal devices in the serving cell,
   a reference signal received power (RSRP) of one or more neighboring cells for one or more terminal devices,
   an RSRP of one or more serving cells for one or more terminal devices,
   a reference signal received quality (RSRQ) of the one or more neighboring cells for one or more terminal devices,
   an RSRQ of the one or more serving cells for one or more terminal devices,
   a throughput of the serving cell,
   a throughput of the one or more neighboring cells,
   a signal-to-noise ratio (SNR) for the serving cell,
   an SNR for the one or more neighboring cells,
   a signal-to-interference-plus-noise ratio (SINR) for the serving cell, or
   an SINR for the one or more neighboring cells.

In some embodiments, the one or more network parameters of the radio access network of block 303 comprise at least a throughput for a serving cell, a throughput for one or more neighboring cells and QoS for one or more terminal devices (e.g., all terminal devices in the serving cell and optionally also all or some of the terminal devices in one or more neighboring cells).

The apparatus determines, in block 304, whether or not at least one conflict exists in the scheduling of the plurality of applications based on the calculated one or more predicted future values of the one or more network parameters. In other words, the apparatus determines whether or not the operation of the plurality of applications for the one or more future time slots causes a conflict. The different conflicts which may be determined or detected in block 304 are discussed in detail after the general discussion of each of blocks 301 to 306.

In some embodiments, the determining in block 304 may be performed in two parts. The apparatus may, first, determine one or more conflict entities for the one or more future time slots based on the calculated one or more predicted future values of the one or more network parameters. Here, a conflict entity may correspond to a parameter (or a set of parameters) adjusted by at least two applications in a conflicting manner (e.g., in opposite directions). Second, the apparatus may determine, for each of the one or more conflict entities, one or more applications of the plurality of applications associated with said conflict entity.

In response to determining that the at least one conflict exists in block 305, the apparatus resolves, in block 306, the at least one conflict by adjusting scheduling of at least one application involved in the at least one conflict. The adjusting of the scheduling may comprise at least suspending (or stopping or pausing or postponing) execution of the at least one application to avoid execution of the at least one application during at least one of the at least one future time slot. The execution of the at least one application may be rescheduled.

The at least one application involved in the at least one conflict whose scheduling is to be adjusted (e.g., by suspending the application) may be selected, in block 306, for example, based on (pre-defined) priority levels of the plurality of applications and/or a (pre-defined) ranking between the plurality of applications. Alternatively or additionally, the at least one application may be selected based on results of penalty calculations carried out for the plurality of applications, where the penalty calculation may relate to a penalty defined in terms of performance impact caused by suspending (and rescheduling) a corresponding application to avoid a conflict.

In response to determining that no conflict exists in block 305, the apparatus may simply not carry out any conflict resolution related actions.

In the following, the conflict detection performed in block 304 is discussed in further detail In some embodiments, each (or at least one) of the at least one conflict determined in block 304 may correspond to a conflict between a value of at least one parameter defined by one of the plurality of applications based on the scheduling and the calculated future values of the network parameters and a value of the at least one parameter defined by another of the plurality of applications based on the scheduling in block 302 and the one or more predicted future values of the network parameters. In other words, each of the at least one conflict corresponds to a conflict between two values of at least one parameter defined, respectively, by two of the plurality of applications based on the scheduling and the one or more predicted future values of the one or more network parameters, the conflict being associated with at least one of the one or more future time slots. The conflict may be associated with at least one of the one or more future time slots.

The at least one parameter causing the at least one conflict may comprise at least one of: one or more handover parameters, a transmission power, one or more antenna parameters, a random access channel for normal bursts (N-RACH), a spectrum allocation or a physical cell identifier (PCI). The one or more handover parameters may comprise, for example, an SINR of the serving cell, an RSRP of the serving cell, an SINR of a neighboring cell, an RSRP of a neighboring cell, a time to trigger and a hysteresis margin. The one or more antenna parameters may comprise, for example, an antenna tilt and/or an antenna power (which may be adjusted by an application, e.g., based on the SINR and interference).

In general, the apparatus may be configured to detect, in block 304, conflicts belonging to one or more different conflict categories or types. For example, each or at least one of the at least one conflict found in block 304 may be one of:

a conflict in at least one key performance indicator to be affected by at least two applications (category C1), a conflict in at least one network configuration parameter to be set (or to be affected indirectly) by at least two applications (category C2), a conflict due to a logical dependency between objectives of at least two applications (category C3), a conflict due to an execution of at least one application using outdated measurement data and at least one other application using up-to-date measurement data (category C4) or a conflict in simultaneous allocation of radio resources by at least two applications (category C5).

Further information regarding the above listed conflict types in connection with the O-RAN architecture is provided in Table I below.

12

TABLE I

| Conflict category | Definition | Examples |
|---|---|---|
| C1: KPI conflict | Occurs when xApp actions alter the same KPI as another xApp | Conflict between CCO and RET & TxP |
| C2: Parameter conflict | Occurs when two xApps try to change the same network configuration parameter with intersecting impact time and area. 1) Output parameter conflict: occurs when two xApps try to change the same network configuration parameter with intersecting impact time and area. i. Magnitude conflict: occurs when xApps aims at changing a different magnitude of network parameter at the same time. ii. Direction conflict: occurs when two xApps aim at modifying the same parameter to opposite directions. 2) Input parameter conflict: occurs when an xApp is triggered by an input network parameter whose value is dependent upon other network parameters. | Output parameter conflict: ICIC and CCO CCO and EE Output parameter conflict (magnitude): MLB & MRO Output parameter conflict (direction): COC & CCO Input parameter conflict: PCI |
| C3: Logical dependency conflict | Occurs if there is a logical dependency between the objectives of xApps | Conflict between: MLB and EE MLB and COC MRO and PCI MLB and PCI |
| C4: Measurement conflict | Occurs if an xApp function is either triggered or computes new parameter values based on outdated measurements. | COC and RET |
| C5: Radio resource conflict | Occurs if two xApps are trying to allocate some resources at the same time with the same objective | RRA and PA |

Table II below provides an exemplary list of xApp conflict scenarios and possible conflict categories that they may encounter. Namely, in Table II, it is illustrated which combinations of two xApps (xApp1 & xApp 2) may lead to conflicts belonging to which different conflict categories. Each 'x' indicates a conflict of a particular type between two different xApps. In Table II, the conflict categories C1-C5 match the conflict categories of Table I.

TABLE II

| xApp1 | xApp2 | C1 | C2.1 | C2.2 | C3 | C4 | C5 |
|---|---|---|---|---|---|---|---|
| CCO | EE | | x | | x | x | |
| MLB | EE | | | | x | x | |
| MRO | EE | | | | x | x | |
| COC | COC | | x | | x | x | |
| PCI | PCI | | | x | | x | |
| MRO | MLB | | x | | | x | |
| CCO | RET&TxP | x | | | | x | |
| CCO | ICIC | | | | x | x | |
| MRO | COC | | | | x | x | |
| COC | RET&TxP | | | | | x | |
| MRO | CCO | | | | x | x | |
| MLB | COC | | | | x | x | |
| MRO | PCI | | | | x | | |
| MLB | PCI | | | | x | | |
| MLB | CCO | | | | x | x | |
| CCO | PCI | | | | x | x | |
| COC | PCI | | | | x | x | |
| RRA | PA | | | x | | | x |

Table III lists examples of different xApps (top row) and corresponding optimization parameters. In Table III, RB stands for resource block (being, e.g., a physical resource block, PRB), TTT stands for time to trigger, CIO stands for cell individual offset, DL stands for downlink, P stands for power, and frequency and antenna are abbreviated, respectively, as "freq." and "ant.". For example, the mobility robustness optimization (MRO) xApp and the mobility load balancing (MLB) xApp if executed simultaneously will likely end up in conflict at least in respect to one of the following five optimization parameters: TTT, CIO, frequency specific offset, cell reselection parameters and hysteresis. To give another example, the inter/intra cell interference control (ICIC) xApp and the energy efficiency (EE) xApp if executed simultaneously will likely end up in conflict at least in respect to the transmit power and/or the antenna parameters/settings.

or more network nodes may comprise one or more access nodes (e.g., gNBs) and/or one or more relay nodes. Moreover, the change in the RAN topology may affect, e.g., PCI and a neighbor relation table (NRT). This scenario may be considered a separate conflict category in addition to the ones listed in Table I. Such a conflict may involve at least one application such as at least one xApp. The at least one xApp which may be vulnerable to conflicts with the changed RAN topology may comprise, e.g., CCO, EE, MRO, ANR, ICIC and/or MLB. Specifically, the conflict may involve a conflict between a value of a parameter set by an application (or an xApp) assuming a previous (or current) RAN topology and a value of said parameter which should be set by the application (or the xApp) for the changed RAN topology. Addition/removal of a network node may have an effect at least on a neighbor relation table (NRT) and the PCI which may affect operation of one or more xApps.

TABLE III

| MRO | MLB | CCO | ICIC | EE | RRA | PA | COC |
|---|---|---|---|---|---|---|---|
| TTT | TTT | DL Tx P | Tx P | Tx P | RBs | Tx P | Tx P |
| CIO | CIO | Ant. tilt | Ant. parameters | Ant. settings | | RBs | Antenna settings |
| Freq. specific offset | Freq. specific offset | Ant. azimuth | Spectrum allocation | | | | |
| Cell reselection parameters | Cell reselection parameters | | | | | | |
| Hysteresis | Hysteresis | | | | | | |

Table IV lists six different conflict entities (i.e., parameters which may be affected by different xApps leading to a conflict) and xApps associated with said conflict entities. For example, the ICIC xApp may decrease transmit power (Tx power) for interference reduction while the CCO xApp may increase the transmit power for coverage improvement. Thus, in this example, the Tx power is the conflicting entity for the combination of the ICIC and CCO xApps. As may be observed based on Table IV, ICIC and CCO xApps may be in conflict alternatively or additionally due to them requiring use of conflicting antenna parameters. Information defining one or more conflict entities and associated xApps (or just applications) may be (similar to as described in Table IV) may be maintained in a memory of the apparatus and be used, by the apparatus, for determining whether or not at least one conflict exists in block 304.

TABLE IV

| Tx power | Handover parameters | Antenna parameters | N-RACH parameters | Spectrum allocation |
|---|---|---|---|---|
| CCO | MRO | CCO | RRA | ICIC |
| ICIC | MLB | ICIC | PA | |
| EE | | COC | | |
| COC | | | | |
| PA | | | | |

Figure 4:
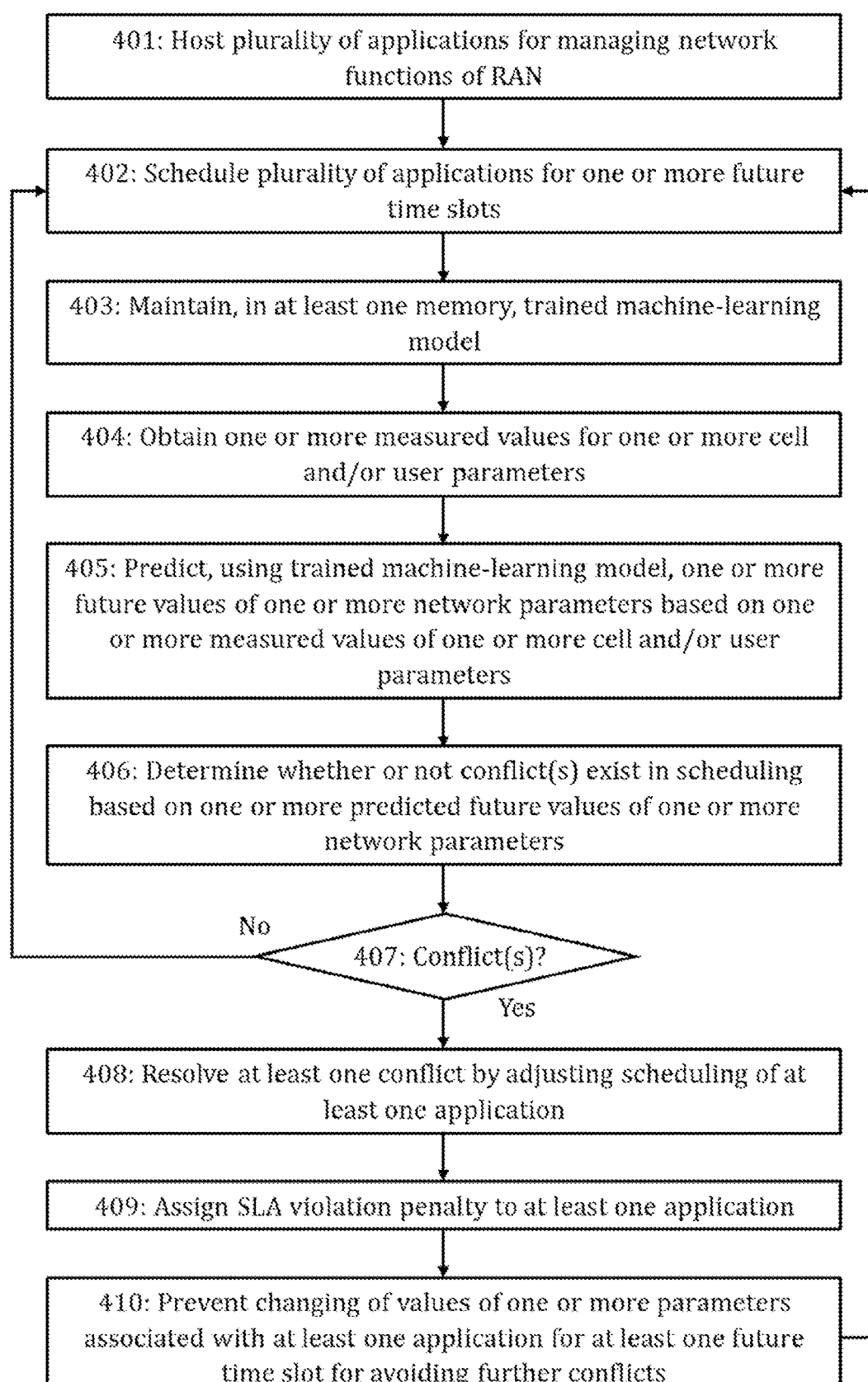

In some embodiments, the apparatus may be configured also to determine, in block 304, whether or not at least one conflict exists in the scheduling of at least one of the plurality of applications resulting from a change in a radio access network topology as predicted by the one or more predicted future values of the one or more network parameters. The change in the RAN topology may relate to an addition of one or more network nodes and/or to a removal of one or more network nodes, where, in either case, the one FIG. 4 illustrates another process according to embodiments for performing conflict resolution. The illustrated process may be performed by an apparatus (e.g., a computing device). The apparatus may form a part of an O-RAN architecture or other similar RAN architecture supporting third-party applications for value-added services. The apparatus may be a near-RT RIC or form a part of a near-RT RIC. Alternatively, the apparatus may be an apparatus (e.g., a computing device) communicatively connected to the near-RT RIC. The near-RT RIC may be, for example, the near-RT RIC 202 of FIG. 2.

The process of FIG. 4 may correspond to one more detailed implementation of the process of FIG. 3. Thus, any of the discussion provided in connection with FIG. 3 may apply, mutatis mutandis, also for the process of FIG. 4.

Referring to FIG. 4, blocks 401 to 402 may correspond fully to blocks 301 to 302 of FIG. 3 and are, thus, not repeated here for brevity.

Blocks 403 to 406 describe in further detail how the obtaining of the one or more predicted future values of the one or more network parameters of the radio access network of block 303 of FIG. 3 may be carried out according to an embodiment. Any of the definitions provided in connection with block 303 of FIG. 3 may apply also here.

Initially, it may be assumed, in block 403, that the apparatus maintains, in at least one memory (e.g., in a particular database), a trained (or pre-trained) machine-learning model for predicting one or more future values of one or more network parameters of the radio access network based on one or more values of one or more cell and/or user parameters measurable in the radio access network. The cell and/or user parameters may be equally called cell and/or user device parameters or cell and/or terminal device parameters. In other words, the one or more values of one or more cell and/or user parameters are the features (i.e., the inputs)

of the trained machine-learning model while the one or more future values of the one or more network parameters of the radio access network are the labels (i.e., the outputs) of the trained machine-learning model.

The cell and/or user parameters relate, as the name implies, to the serving cell and/or one or more neighboring cells thereof and/or to one or more terminal devices (equally called user devices) located at the serving cell. The one or more cell and/or user parameters may comprise, for each of one or more terminal devices, at least parameters for defining, either explicitly or implicitly, a location of a terminal device within its serving cell and a most probable next serving cell of a terminal device. The prediction of the most probable next serving cell for a given terminal device may be based, e.g., on one or more angle-of-arrival (AoA) measurements at an access node (e.g., a gNB), one or more angle-of-departure (AoD) measurements at the access node and/or one or more antenna beam direction measurements at the access node (in transmission and/or reception). Here, the access node may correspond to the access node associated with the near-RT RIC (which is associated with the apparatus).

In some embodiments, the one or more cell and/or user parameters may comprise:

a cell area of a serving cell, a speed of one or more terminal devices, and at least one of an angle of arrival from one or more terminal devices, an angle of departure for transmission to one or more terminal device, a beam identifier for a beam for transmission to or reception from one or more terminal devices an antenna tilt for transmission to or reception from one or more terminal devices, or an antenna beam direction for transmission to or reception from one or more terminal devices.

The trained machine-learning model may have been trained previously by the non-RT RIC of the SMO (or offline using some other apparatus or computing device) based on a training data set comprising a plurality of values of the one or more cell and/or user parameters and a plurality of corresponding (future) values for the one or more network parameters (i.e., comprising a plurality of values of the features and associated plurality of values of the labels). The plurality of the corresponding values for the one or more network parameters may be measured values (not predicted values). The training data set may have been collected, for example, using one or more (distributed) access nodes. The trained machine-learning model may have been communicated to the apparatus, e.g., via the AI interface. The (trained) machine-learning model may be based, e.g., on one or more artificial neural networks (ANNs) of one or more different types (e.g., one or more convolutional neural networks), deep reinforcement learning (RL), long short-term memory (LSTM) and/or multi agent (reinforcement) learning.

In some embodiments, the machine-learning model may be an ANN-based machine-learning model as described in connection with FIGS. 10 and 11.

The apparatus obtains, in block 404, one or more measured values for the one or more cell and/or user parameters. The one or more measured values may be values which have been measured recently in the radio access network and subsequently communicated to the apparatus (via an RU and a DU and optionally a CU). Thus, the obtaining in block 404 may comprise receiving the one or more measured values from an access node or from a DU (or an O-DU) or a CU (or an O-CU) of a distributed access node. The one or more measured values for the one or more cell and/or user parameters may comprise, for each of the one or more cell and/or user parameters, one or more values corresponding to one or more respective time slots.

The apparatus predicts, in block 405, using the trained machine-learning model, the one or more future values of the one or more network parameters for the one or more future time slots based on at least the one or more measured values of the one or more cell and/or user parameters. The one or more future values of the one or more network parameters for the one or more future time slots may be defined as described in connection with block 303 of FIG. 3.

Blocks 406 to 408 may correspond fully to blocks 304 to 306 of FIG. 3 and are, thus, not repeated here for brevity.

In response to determining that at least one conflict exists in block 407, the apparatus not only resolves, in block 408, the at least one conflict by adjusting scheduling of at least one application involved in the at least one conflict (as described in connection with block 306 of FIG. 3 above) but also carries out two further actions in blocks 409, 410. Firstly, the apparatus assigns, in block 409, a service level agreement (SLA) violation penalty associated with a performance degradation to each of the at least one application (e.g., at least one xApp) whose scheduling is adjusted in block 408. The SLA violation penalty may be defined specifically as a performance degradation (e.g., a QoS degration) applied in the RAN if a given application (e.g., a given xApp) is not allowed to execute in a particular instance of time. The SLA violation penalty may be assigned to each unmet application (e.g., xApp) request. The unmet application request(s) correspond to the at least one application suspended (or rescheduled or paused) due to the detection of a conflict with another application that has a similar but conflicting KPI target or some other conflicting parameter.

Secondly, the apparatus prevents, in block 409, changing of values of one or more parameters associated with the at least one application suspended in block 407 for one or more future time slots for avoiding further conflicts resulting from the at least one conflict. In other words, the apparatus "locks" values of the one or more parameters associated with the at least one application for the one or more future time slots so as to prevent nested conflicts. The one or more locked parameters may comprise all or at least some of the parameters associated with the at least one application. The one or more future time slots may comprise the at least one time slot during which the at least one application is suspended or stopped and/or one or more subsequent time slots.

It should be emphasized that the actions described in connection with blocks 409, 410 may not be applied to any conflicting application (e.g., at least one conflicting xApp) which is involved in said at least one conflict but whose scheduling was not adjusted in block 408.

In some embodiments, the apparatus may, instead of locking the current value defined for a given parameter (or multiple parameters) associated with the at least one application, first set a new value for said parameter and lock said new value for said one or more future time slots.

A nested conflict may be defined as a conflict caused, at least in part, by at least one earlier conflict. A nested conflict may change the priorities of the ongoing conflict resolution scheme as some conflicts which are themselves low priority conflicts may be able to trigger or cause high priority conflicts. For example, a conflict between the MLB & MRO xApps will trigger both CCO and EE xApps which may also conflict with each other, as shown in Table II. On the other hand, a PCI-related conflicts will not trigger any further conflicts as a PCI-related conflict will only occur when two PCI xApps with intersecting impact areas are executed at the same time.

To give another example, for a high priority MLB xApp, a certain xApp decision or action may trigger a conflict between the CCO and EE xApps which may, in turn, eventually trigger the MRO xApp. An MRO and MLB conflict may have a severe impact not only on the end-user QoS due to handover problems (e.g., call drop and/or radio link failure, RLF), but also on the efficiency of network resource utilization due to ping pong and problems due to an overdue handover. The purpose of block 409 is to prevent such behavior. The MLB triggering parameters may comprise an RSRP of a serving cell and one or more neighboring cells, an RSRQ of the serving cell and the one or more neighboring cells, hysteresis, CIO and a signal-to-interference-plus-noise (SINR) of the serving cell and the one or more neighboring cells.

In some embodiments, the apparatus may maintain, in at least one memory, information on one or more nested conflict scenarios where a conflict between the plurality of applications is known to result or potentially result in further conflicts later on. The preventing of the changing of values of the one or more cell and/or user parameters in block 409 may be performed based on said information on the one or more nested conflict scenarios.

In some embodiments, only one of the features described in connection with blocks 409, 410 may be implemented. In other embodiments, neither of the features described in connection with blocks 409, 410 may be implemented.

In some embodiments, one or both of the features described in connection with blocks 409, 410 may be combined with the more general process of FIG. 3.

Figure 5:
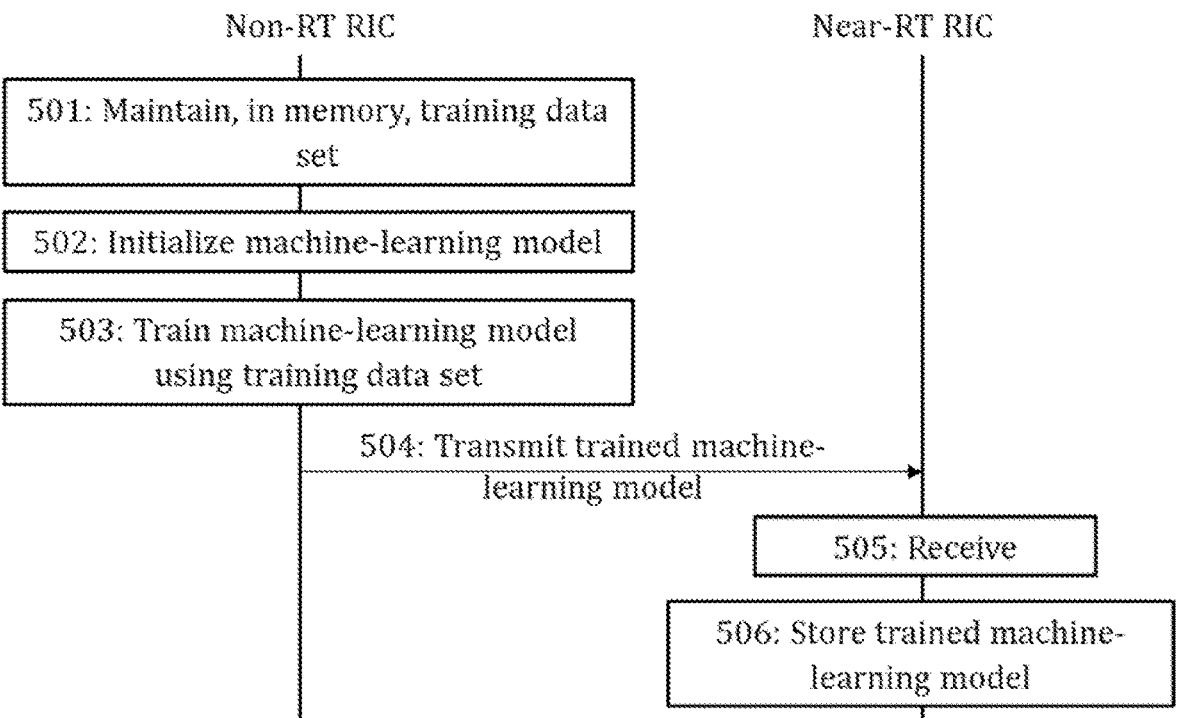
FIG. 5 illustrates exemplary signaling according to embodiments.

FIG. 5 illustrates signaling according to embodiments between a non-RT RIC and a near-RT RIC of the O-RAN architecture. The purpose of the procedure of FIG. 5 is generating and training a machine-learning model (as described in connection with FIG. 4) by the non-RT RIC and providing said trained machine-learning model to the near-RT RIC (i.e., deploying the trained machine-learning model). The non-RT RIC and the near-RT RIC of FIG. 5 may correspond, respectively, to the non-RT RIC 212 and the near-RT RIC 202 of FIG. 2.

Referring to FIG. 5, the non-RT RIC may be assumed to initially maintain, in block 501, in at least one memory of the non-RT RIC, a training data set. The training data set may have been obtained (e.g., collected and/or measured) from the RAN over a certain period of time. The training data may have been obtained, by the non-RT RIC, from a data lake implemented via the O1 interface of the O-RAN architecture.

The training data set may comprise a plurality of values of one or more network parameters of the RAN and a plurality of values of one or more cell and/or user parameters. The one or more network parameters of the RAN and the one or more cell and/or user parameters may be defined as described in connection with FIGS. 3 and/or 4. The training data set may specifically comprise a plurality of sets of one or more values of the one or more network parameters and a plurality of respective sets of one or more values of the cell and/or user parameters, where the one or more values of the network parameters in a given set correspond to a later time instance (or one or more later time slots) relative to the corresponding set of one or more values of the one or more cell and/or user parameters. In other words, the one or more values of the network parameters of a given set are future values from the point of view of the corresponding one or more values of the one or more cell and/or user parameters (though all the values in the training data set are, in actuality, measured past values).

The non-RT initializes, in block 502, a machine learning model. The machine learning model may be any machine learning model or algorithm as discussed above in relation to embodiments. The initialization may comprise generating the machine learning model and/or setting or selecting initial values for weights, parameters and/or hyperparameters of the machine learning model (e.g., weights of one or more neural networks). While values of "normal" parameters and weights are trained during the training process (i.e., they change), a hyperparameter is a parameter whose value is set before the learning process begins and which does not change during the learning process. Any known initialization technique may be employed in the initialization of block 502.

The initial values defined in the initialization in block 502 may be random values or they may correspond to a predefined set of values known to result in a well-performing model (or algorithm).

The non-RT RIC trains, in block 503, the machine learning model using the training data set. In the training, the one or more cell and/or user parameters are features (i.e., input or feature vector or vectors) of the machine-learning model, and the one or more network parameters are labels (i.e., output or label vector) of the machine learning model. In other words, the sets of one or more ("recent") values of the one or more cell and/or user parameters correspond to feature(s) (i.e., input or feature vector or vectors) of the machine-learning model and the sets of one or more ("future") values of the one or more network parameters correspond to label(s) (i.e., output or label vector) of the machine learning model.

In some embodiments, the non-RT RIC may, following the training in block 503, package the trained machine-learning model as an xApp and/or set associated policies. The O1 interface may be used to deploy the trained machine-learning model. The AI interface may be used for configuring the policies.

Following the training in block 503, the non-RT RIC transmits (or deploys), in message 504, the trained machine-learning model (or the packaged trained machine-learning model) to the near-RT RIC. The transmissions may be carried out, e.g., via the AI interface or the O1 interface.

The near-RT RIC receives, in block 505, the trained machine-learning model from the non-RT RIC. Subsequently, the near-RT RIC stores, in block 506, the trained machine-learning model to at least one memory of the near-RT RIC. Thereafter, the near-RT RIC may carry out using the trained machine-learning model, e.g., the process of FIG. 4.

In some embodiments, actions relating to elements 503, 504 may be repeated, after the initial training, regularly or periodically or each time new training data is received.

Figure 6:
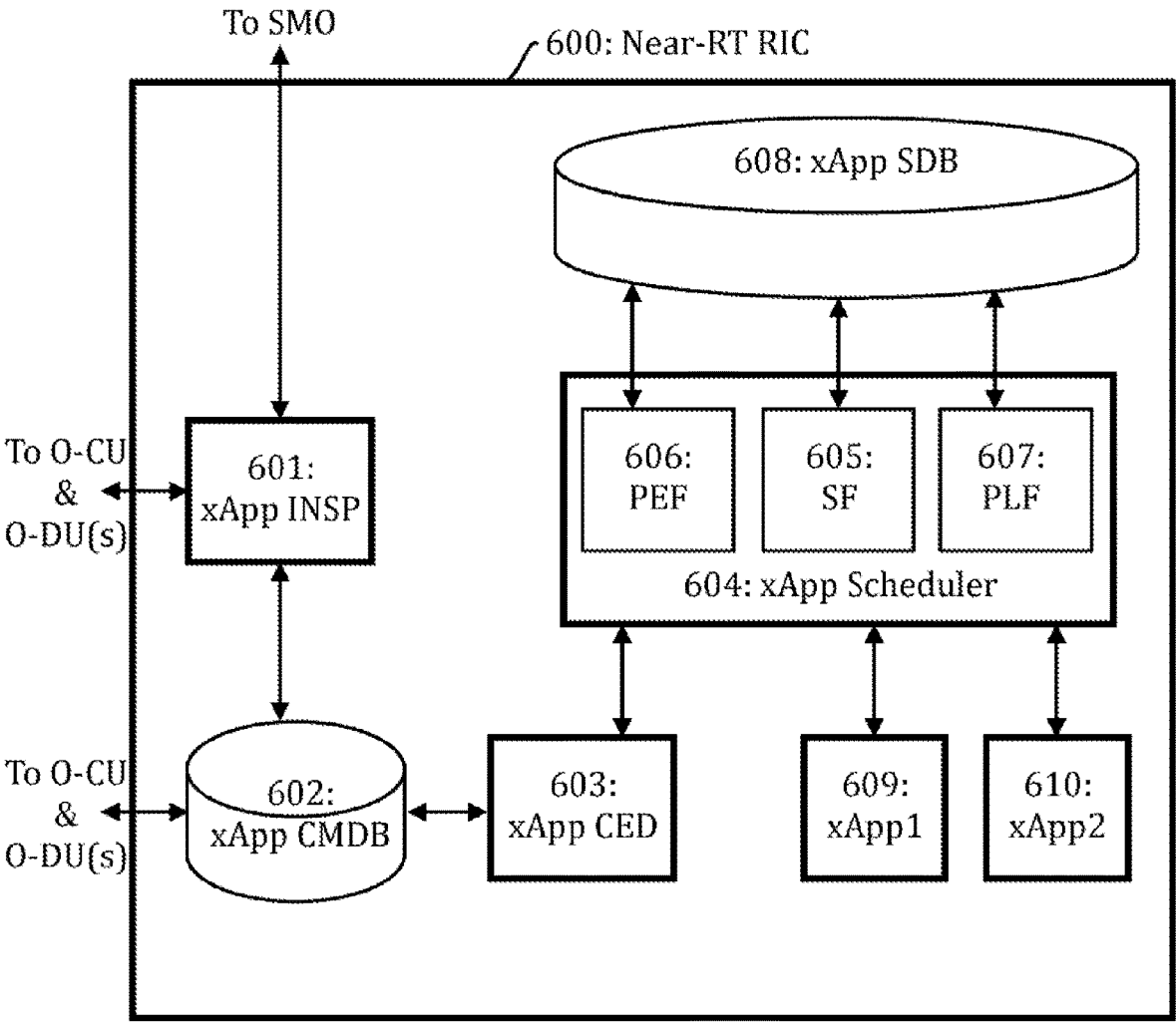
FIG. 6 illustrates an exemplified near-RT RIC architecture.

FIG. 6 illustrates an exemplary architecture of a near-RT RIC 600 which may be used in connection with embodiments. The near-RT RIC 600 of FIG. 6 may correspond to one more detailed implementation of the near-RT RIC 202 of FIG. 2. Additionally or alternatively, the near-RT RIC 600 may form a part of the wireless communication system of FIG. 1. Thus, any of the definitions provided in connection with FIGS. 1 and/or 2 may apply, mutatis mutandis, for FIG. 6, unless otherwise explicitly stated.

FIG. 6 shown an example of an architecture showing some elements and functional entities, some or all being logical units, whose implementation may differ from what is shown. The connections shown in FIG. 6 are logical connections; the actual physical connections may be different. It is apparent to a person skilled in the art that a near-RT RIC may also comprise other functions, structures and/or databases than those shown in FIG. 6.

The system of FIG. 6 comprises an xApp intelligent network state predictor (INSP) 601, an xApp conflict mitigation database (CMDB) 602, an xApp conflict entity detector (CED) 603, an xApp scheduler 604, an xApp scheduler database (SDB) 608 and a plurality of xApps of which two 609, 610 are explicitly shown in FIG. 6.

The xApp INSP 601 is at least configured to predict future values of network parameters for one or more future time slots (e.g., for the next 100 ms) based on a trained machine-learning model described in connection with FIG. 4. Thus, the xApp INSP 601 may carry out functionalities described, e.g., in connection with blocks 404, 405 of FIG. 4. The xApp INSP 601 may be communicatively connected to the SMO (or at least the non-RT RIC thereof) for receiving the trained machine-learning model as well to an O-CU and/or one or more O-DUs external to the near-RT RIC 600 for receiving at least the measured values of one or more cell and/or user parameters used as inputs (or features) of the trained machine-learning model. The xApp INSP 601 may have been deployed on the near-RT RIC using, e.g., representational state transfer (REST) APIs.

The results of the prediction (i.e., future values of the one or more network parameters) performed by the xApp INSP 601 are stored to the xApp CMDB 602. The xApp CMDB 602 may also store any manually entered information regarding, for example, one or more possible conflict scenarios along with detailed information regarding one or more known conflicts such as xApp identifier(s) of associated xApps, xApp parameter optimization information, a conflict category of the conflict, conflicting parameters, a conflict entity, SLA penalties to be imposed, xApp priority level of one or more xApps, and/or xApp conflict resolution information (i.e., information on how the conflict is to be resolved). The xApp CMDB 602 is accessible by both the xApp INSP 601 and the xApp CED 603. The xApp CMDB 602 may also be accessible by the O-CU and/or the one or more O-DUs external to the near-RT RIC 600. The xApp CMDB 602 may be updated, e.g., during the process of xApp on-boarding to the near-RT RIC.

The xApp CED 603 is at least configured to detect conflicts based on the information stored in the xApp CMDB 602 (e.g., predicted future values of the one or more network parameters and optionally known conflict scenarios). Thus, the xApp CED 603 may carry out functionalities described, e.g., in connection with blocks 304, 305 of FIG. 3 and/or blocks 406, 407 of FIG. 4.

The xApp scheduler 604 comprises a main xApp scheduler function (SF) 605 as well as at least two subfunctions: a policy enforcement function (PEF) 606 and a parameter locking function (PLF) 607.

The xApp scheduler 604 or specifically the SF 605 may be configured at least to call (or request) the xApp CED 603 periodically (e.g., every pre-defined time slot) so as to receive, as a response, information on one or more conflicts predicted to occur during at least one future time slot (e.g., a list of conflict entities associated with the at least one future time slot) and to carry out scheduling of the xApps 609, 610 based on the received information. Thus, the SF 605 may carry out functionalities described, e.g., in connection with blocks 301, 302 of FIG. 3 and/or blocks 401, 402 of FIG. 4. The SF 605 may store information on the one or more conflicts and/or on any scheduling decisions to the xApp SDB 608. The SF 605 may be further configured to request policy enforcement and/or parameter locking from the PEF 606 and the PLF 607, respectively. The specific logic of the xApp scheduler 604 (or the SF 605) is up to the operator and may even, in some cases, integrate machine-learning-based scheduling algorithm(s) to improve the performance of the scheduling decision-making.

The PEF 606 of the xApp scheduler 604 may be configured at least to identify the xApp(s) which correspond to each conflict entity, to suspend (or pause or reschedule) the identified xApp(s) 609, 610 and to assign an SLA violation penalty to each unmet xApp request. Thus, the PEF 606 may carry out functionalities described, e.g., in connection with block 306 of FIG. 3 and/or blocks 408, 409 of FIG. 4. The PEF 606 may store any identified conflict entities and/or identified conflicting xApps 609, 610 and/or associated SLA violation penalties to the xApp SDB 608.

The PLF 607 of the xApp scheduler 604 may be configured at least to, when a conflict is detected, lock certain parameters used by the suspended xApp 609, 610 for avoiding nested conflicts. Thus, the PLF 607 may carry out functionalities described, e.g., in connection with block 410 of FIG. 4. The PLF 607 may store information on any identified nested conflicts, parameters to be locked and/or locking durations to the xApp SDB 608.

The xApp SDB 608 may store, in addition to the information indicated above, also xApp metadata comprising xApp input and output parameters, i.e., any parameters for triggering the xApps 609, 610 and any parameters that the xApps 609, 610 change after their respective operation.

The plurality of xApps 609, 610 hosted by the near-RT RIC 600 may be defined as described, e.g., in connection with FIG. 2. During their execution, each xApp 609, 610 may consult with the xApp scheduler 604 (or the SF 605) via a dedicated interface to acquire information on the allowed time slot for their operation. If a given xApp is not allowed to operate within a particular time interval, the execution of said xApp is paused and subsequently continued at its allowed time slot.

In some embodiments, the PLF 607 may omitted.

Figure 7:
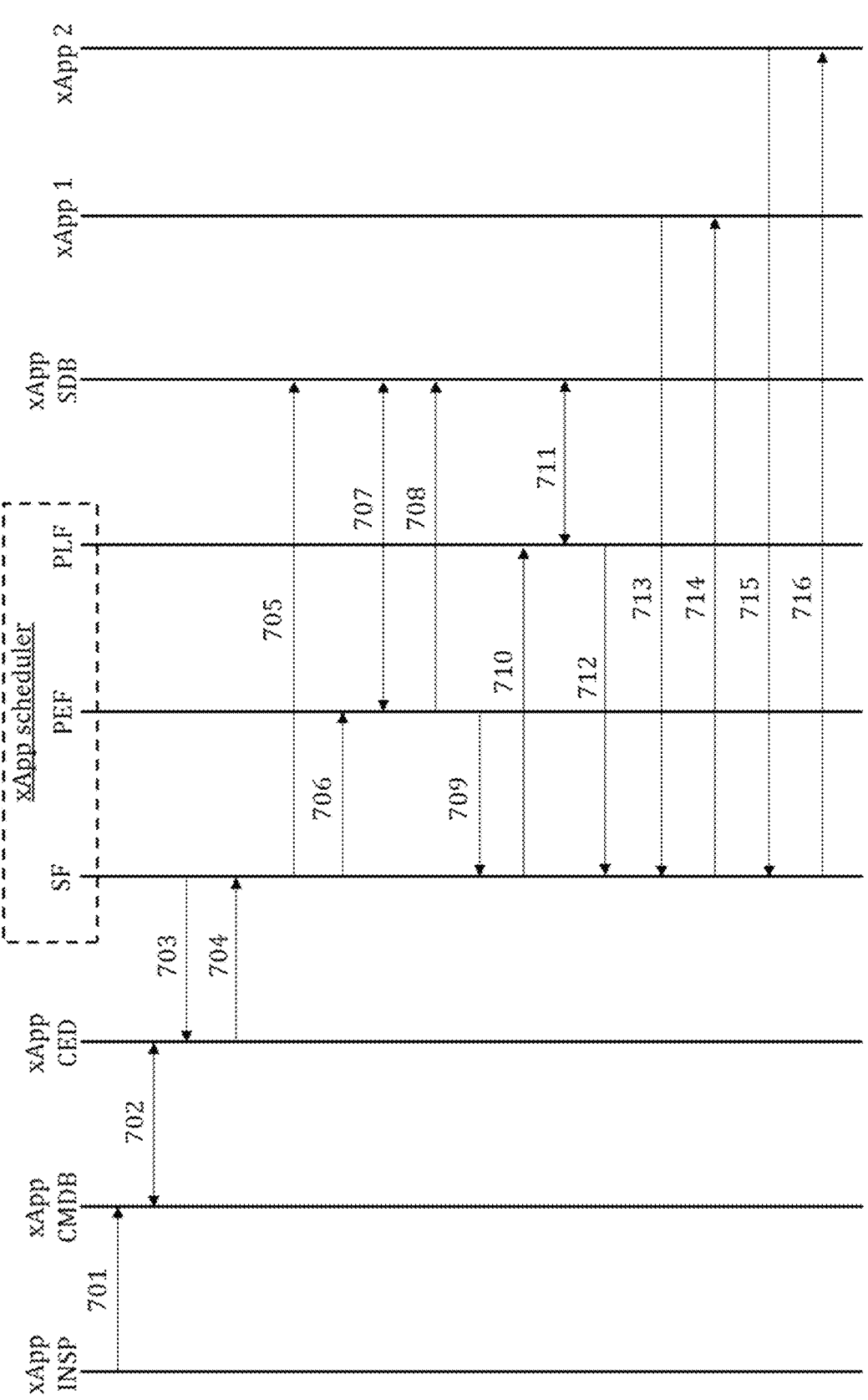
FIG. 7 illustrates signaling involving the exemplified near-RT RIC architecture of FIG. 6.

FIG. 7 illustrates signaling according to embodiments between the different entities of FIG. 6 (namely, xApp INSP, xApp CMDB, xApp CED, SF, PEF, PLF, xApp SDB, xApp 1 and xApp 2 (e.g., ICIC and CCO xApps) for performing xApp conflict mitigation. FIG. 7 corresponds to a simplified presentation where only the signaling between different entities is shown, i.e., any operations performed by a given entity alone are not explicitly shown.

Referring to FIG. 7, it is initially assumed that the xApp INSP has just predicted, using a trained machine-learning model, one or more future values of one or more network parameters based on one or more measured values of one or more cell and/or user parameters measured in the RAN (and received via the E2 interface). The trained machine-learning model may have been acquired from a non-RT RIC. The xApp INSP stores, in message 701, a network parameter prediction update to the xApp CMDB. The network parameter prediction update comprises at least said one or more future values of one or more network parameters. Thus, message 701 may correspond to block 303 of FIG. 3.

The xApp CED retrieves, in messages 702, at least the one or more predicted network parameters (and optionally one or more pre-defined network parameters) from the xApp CMDB and performs conflict entity detection based on the retrieved information. Thus, messages 702 may correspond to block 304 of FIG. 3 or block 406 of FIG. 4.

The SF of the xApp scheduler transmits, in message 703, a request for any conflict entities associated with at least one future time slot (e.g., time slots t=10, 20, . . . , 100 ms). The xApp CED receives the request and transmits, in message 704, a response comprising a list of one or more detected future conflict entities (e.g., conflicting parameters associated with xApps). Here, it is assumed that at least one conflict is defined in said list though, in general, this list may also be empty if no possible conflicts are in sight. As an example, the list may define conflict entities of Tx power and antenna parameters for the xApp combination CCO & ICIC.

The SF of the xApp scheduler stores, in message 705, the list of the one or more detected future conflict entities to the xApp SDB.

The SF of the xApp scheduler transmits, in message 706, a request for upcoming xApp conflict detection and resolution to the PEF of the xApp scheduler.

Based on the request, the PEF of the xApp scheduler performs, in messages 707, identification of the xApps corresponding to the one or more detected conflict entities using the list of the one or more detected future conflict entities stored in the xApp SDB and resolves the at least one conflict by determining to suspend or pause at least one of the identified xApps. The PEF of the xApp scheduler further calculates, in messages 707, an SLA violation penalty for each unmet xApp request (i.e., for each xApp to be suspended or paused), similar to block 409 of FIG. 4.

The PEF of the xApp scheduler stores, in message 708, an xApp scheduling decision for the at least one future time slot to the xApp SDB. The xApp scheduling decision is assumed to define suspension or pausing of at least one conflicting xApp for the at least one future time slot or a part thereof.

The PEF of the xApp scheduler transmits, in message 709, a conflict resolution acknowledgment to the SF of the xApp scheduler.

Following the reception of the conflict resolution acknowledgement, the SF of the xApp scheduler transmits, in message 710, a request for detecting future xApp nested conflicts and resolution thereof to the PLF of the xApp scheduler.

Based on the request, the PLF of the xApp scheduler performs, in messages 711, detection of any nested conflicts based at least on the list of the one or more detected future conflict entities stored to the xApp SDB, identification of one or more parameters to be locked to prevent said nested conflicts and optionally also duration of the locking. Thus, messages 711 may correspond to block 410 of FIG. 4. It is assumed in FIG. 7 that one or more parameters of the xApp 1 need to be locked for one or more future time slots (or for a certain locking duration) and one or more parameters of the xApp 2 need to be locked for one or more future time slots (or for a certain locking duration). The locked parameters of xApp 1 and 2 may be the same or different. For example, if the xApps 1 and 2 are, respectively, ICIC & CCO and the detected conflict entities comprise Tx power and antenna parameters, the Tx power having a value set by one of the ICIC & CCO may be locked to prevent further conflicts due to a change in the Tx power.

The PLF of the xApp scheduler transmits, in message 712, a parameter locking acknowledgment to the SF of the xApp scheduler.

The xApp 1 transmits, in message 713, a request for an execution time slot (and possible one or more parameters to be locked) to the SF of the xApp scheduler. The xApp 1 may request the SF of the xApp scheduler at a first pre-defined time interval. The SF of the xApp scheduler transmits, in message 714, an execution time slot along with the one or more parameters of the xApp 1 to be locked and optionally an associated locking duration to xApp 1. Alternatively, message 714 may define that the xApp 1 is to be suspended for at least one time slot.

Similarly, the xApp 2 transmits, in message 715, a request for an execution time slot (and possible one or more parameters to be locked) to the SF of the xApp scheduler. The xApp 2 may request the SF of the xApp scheduler at a second pre-defined time interval. The SF of the xApp scheduler transmits, in message 716, an execution time slot along with the one or more parameters of the xApp 2 to be locked and optionally an associated locking duration to xApp 2. Alternatively, message 715 may define that the xApp 2 is to be suspended for at least one time slot.

The actions described in connection with elements 713-714 and with elements 715-716 may be repeated periodically.

It should be emphasized that FIGS. 6 & 7 illustrates merely one possible architecture of a near-RT RIC which may be employed in connection with embodiments. Other implementations may comprise, e.g., a single database or more than two databases and/or different number of functional entities compared to FIG. 6. Any of the features described in connection with FIGS. 6 & 7 may apply, mutatis mutandis, for such alternative architectures.

The blocks, related functions, and information exchanges described above by means of FIGS. 3, 4 and 7 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 8:
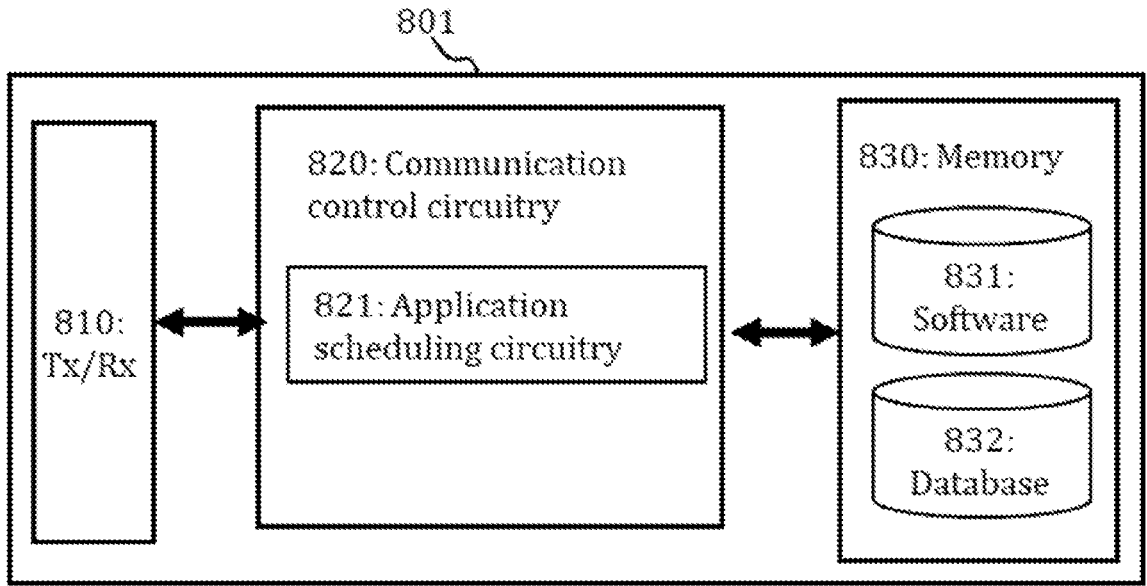
FIGS. 8 and 9 illustrate apparatuses according to embodiments.

FIG. 8 provides an apparatus 801 according to some embodiments. Specifically, FIG. 8 illustrates an apparatus 801 configured to carry out at least some of the near-RT RIC functionalities according to embodiments described above. The apparatus 801 may be a near-RT RIC or a part (e.g., a computing device) thereof or an apparatus communicatively connected to the near-RT RIC, where the near-RT RIC may be, e.g., the near-RT RIC 202 of FIG. 2 or the near-RT RIC 600 of FIG. 6.

The apparatus 801 may comprise one or more communication control circuitry 820, such as at least one processor, and at least one memory 830, including one or more algorithms 831, such as a computer program code (software) wherein the at least one memory and the computer program code (software) are configured, with the at least one processor, to cause the apparatus to carry out any one of the exemplified near-RT RIC functionalities described above.

Referring to FIG. 8, the communication control circuitry 820 of the apparatus 801 may comprise at least application scheduling circuitry 821 (e.g., xApp scheduling circuitry) which is configured at least to carry out execute at least the near-RT RIC functionalities described in connection with any of FIGS. 3 to 7, using one or more individual circuitries.

Referring to FIG. 8, the memory 830 may be implemented using any suitable data storage technology, such as semiconductor based memory devices, flash memory, magnetic memory devices and systems, optical memory devices and systems, fixed memory and removable memory.

Referring to FIG. 8, the apparatus 801 may further comprise different interfaces 810 such as one or more communication interfaces (TX/RX) comprising hardware and/or software for realizing communication connectivity over the medium according to one or more communication protocols. The communication interface may provide the apparatus 801 with communication capabilities to communicate in the cellular communication system and enable communication to different network nodes or elements (e.g., to a non-RT RIC and/or to one or more DUs and/or one or more CUs of a distributed access node), for example. The one or more communication interfaces may comprise standard well-known components such as an amplifier, filter, frequency-converter, (de)modulator, and encoder/decoder circuitries, controlled by the corresponding controlling units, and one or more antennas. The apparatus 801 may also comprise one or more user interfaces.

Figure 9:
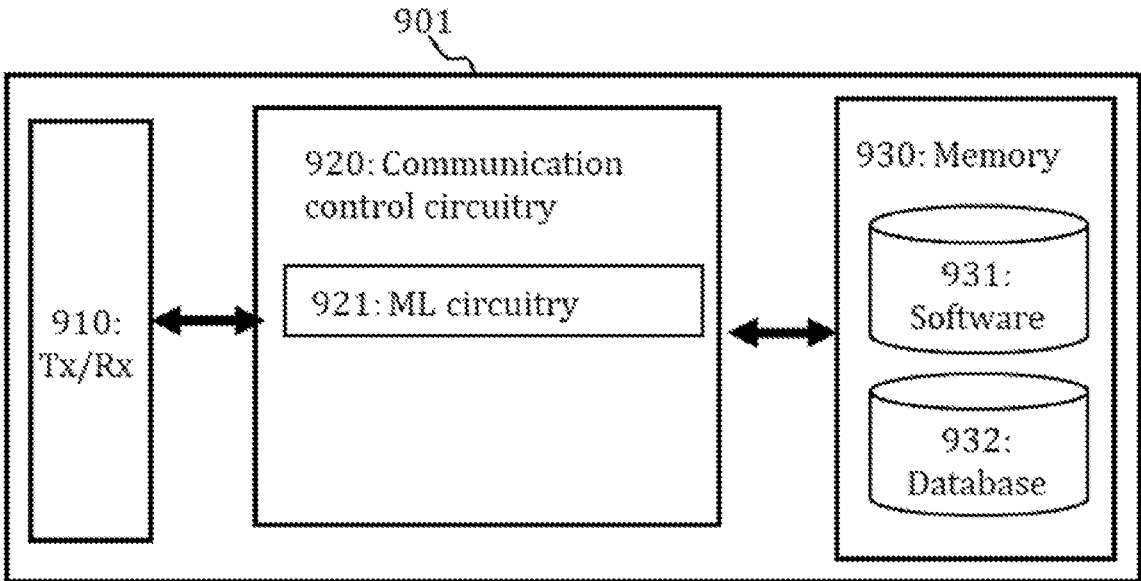

FIG. 9 provides an apparatus 901 according to some embodiments. Specifically, FIG. 9 illustrates an apparatus 901 configured to carry out at least some of the non-RT RIC functionalities according to embodiments described above. The apparatus 901 may be a non-RT RIC or a part (e.g., a computing device) thereof or an apparatus communicatively connected to the non-RT RIC, where the non-RT RIC may be, e.g., the non-RT RIC 212 of FIG. 2.

The apparatus 901 may comprise one or more communication control circuitry 920, such as at least one processor, and at least one memory 930, including one or more algorithms 931, such as a computer program code (software) wherein the at least one memory and the computer program code (software) are configured, with the at least one processor, to cause the apparatus to carry out any one of the exemplified non-RT RIC functionalities described above.

Referring to FIG. 9, the communication control circuitry 920 of the apparatus 901 may comprise at least machine-learning (ML) circuitry 921 which is configured at least to carry out execute at least the non-RT RIC functionalities described in connection with any of FIG. 5, using one or more individual circuitries.

Referring to FIG. 9, the memory 930 may be implemented using any suitable data storage technology, such as semiconductor based memory devices, flash memory, magnetic memory devices and systems, optical memory devices and systems, fixed memory and removable memory.

Referring to FIG. 9, the apparatus 901 may further comprise different interfaces 910 such as one or more communication interfaces (TX/RX) comprising hardware and/or software for realizing communication connectivity over the medium according to one or more communication protocols. The communication interface may provide the apparatus 901 with communication capabilities to communicate in the cellular communication system and enable communication to different network nodes or elements (e.g., to a near-RT RIC), for example. The one or more communication interfaces may comprise standard well-known components such as an amplifier, filter, frequency-converter, (de)modulator, and encoder/decoder circuitries, controlled by the corresponding controlling units, and one or more antennas. The apparatus 901 may also comprise one or more user interfaces.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node or an LMF, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 3 to 7 may be carried out by an apparatus (e.g., a computing device or a network node) comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 7 or operations thereof.

According to an aspect, there is provided an apparatus (e.g., a near-RT RIC) comprising means for performing:

hosting a plurality of applications for managing network functions of a radio access network;

scheduling the plurality of applications for one or more future time slots;

obtaining one or more predicted future values of one or more network parameters of the radio access network for the one or more future time slots;

determining whether or not at least one conflict exists in the scheduling of the plurality of applications based on the one or more predicted future values of the one or more network parameters; and in response to determining that the at least one conflict exists, resolving the at least one conflict by adjusting scheduling of at least one application involved in the at least one conflict.

In embodiments, the at least one processor, the memory, and the computer program code form processing means or comprises one or more computer program code portions for carrying out one or more operations according to any one of the embodiments of FIGS. 3 to 7 or operations thereof.

Embodiments as described may also be carried out in the form of a computer process defined by a computer program or portions thereof. Embodiments of the methods described in connection with FIGS. 3 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

The term "non-transitory," as used herein, is a limitation of the medium itself (i.e., tangible, not a signal) as opposed to a limitation on data storage persistency (e.g., RAM vs. ROM).

Embodiments described above provide at least the following advantages. The proposed conflict mitigation solution and associated methods may be easily implemented in the current O-RAN framework and may be subsequently used for resolving any conflict scenarios that might occur at any time in the network due to the operation of different xApps with overlapping KPIs or other parameters. The incorporation of AI/ML techniques for network status prediction can improve further the performance of the proposed solution.

Figure 10:
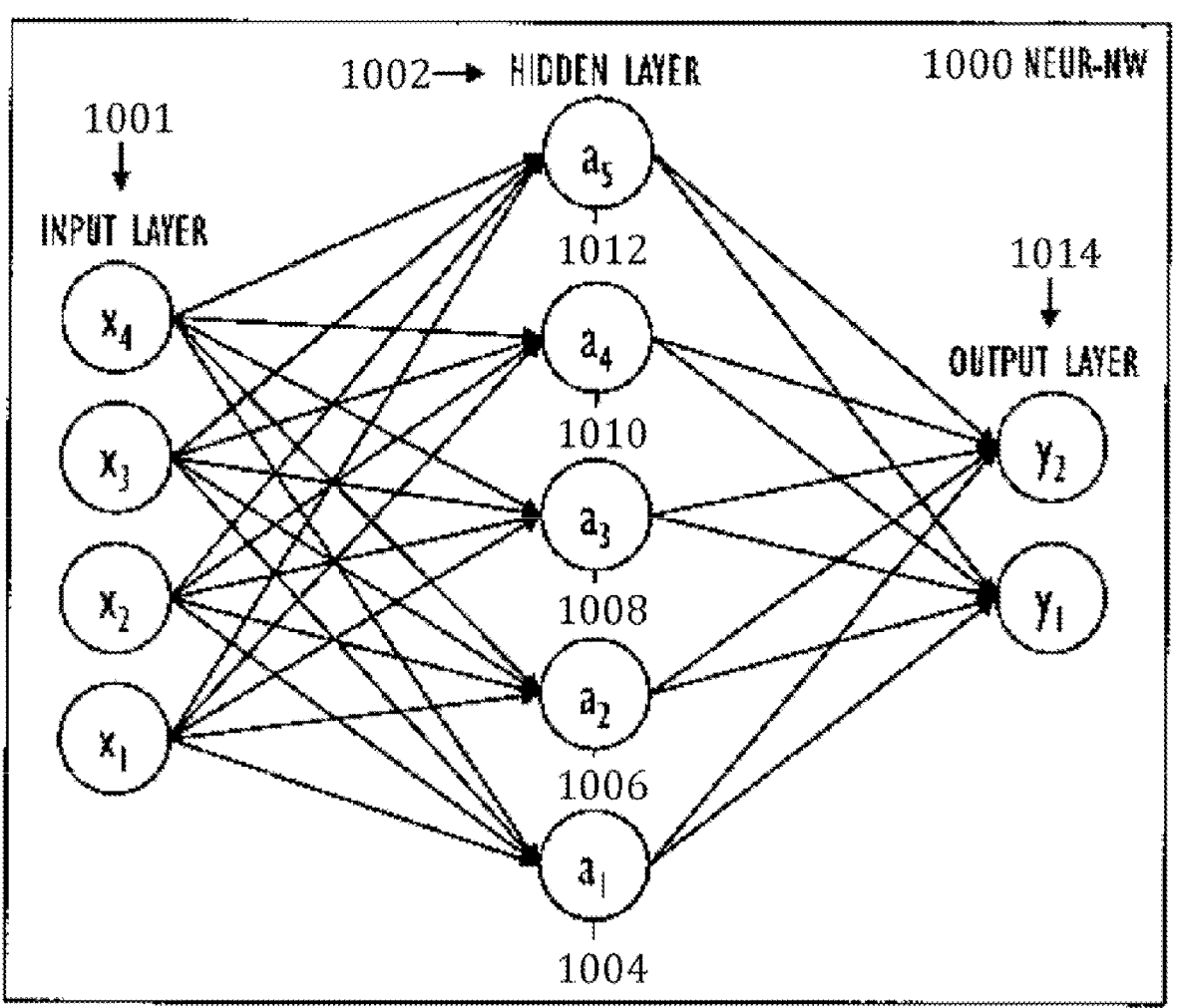
FIG. 10 illustrates a neural network according to an embodiment.
Figure 11:
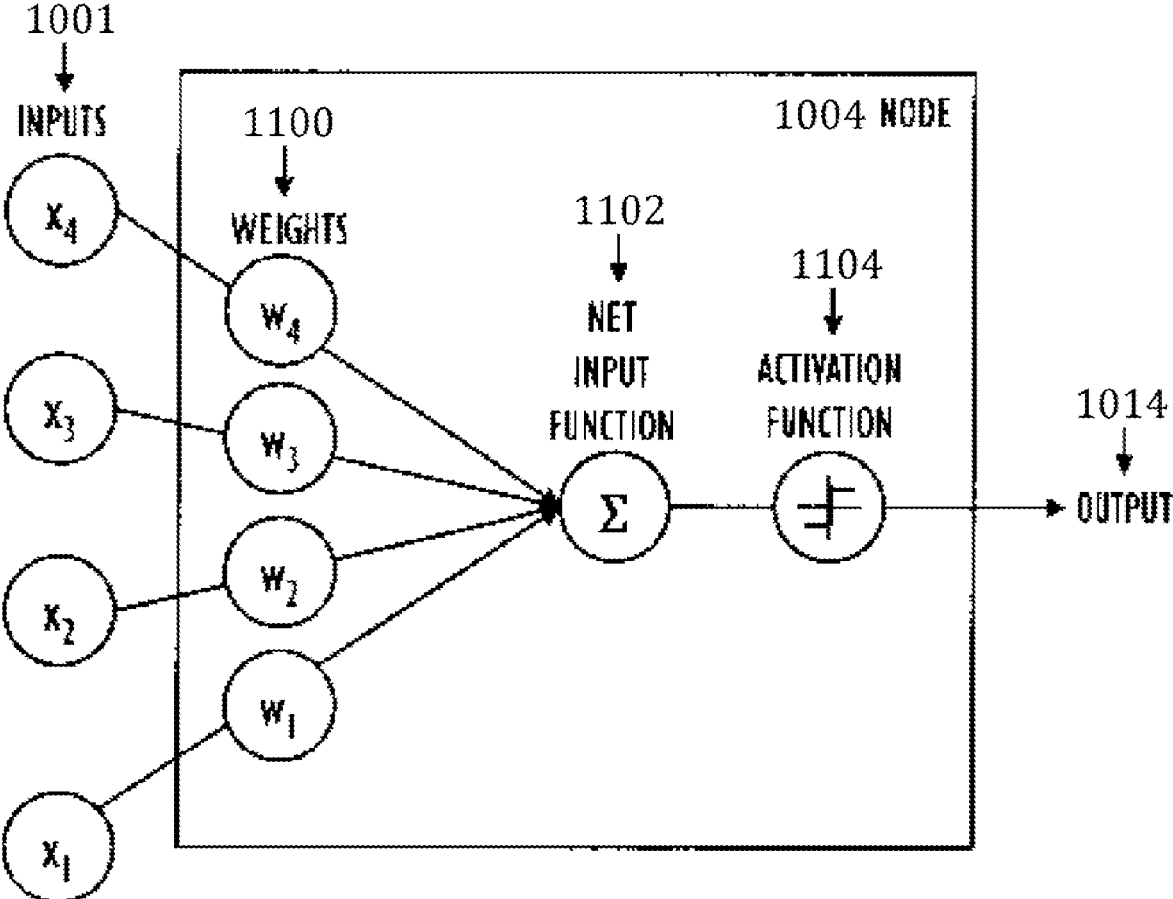
FIG. 11 illustrates a computational node a neural network according to an embodiment.

FIG. 10 illustrates an embodiment of the neural network 1000 with one hidden layer, and FIG. 11 illustrates an embodiment of a computational node 1004 of said neural network 1000. As described above, at least some of the embodiments may involve one or more machine-learning models. Any of the machine-learning models as described above in connection with any of FIGS. 2 to 9 may be defined as will be described in connection with FIGS. 10 and 11 below.

Deep learning (also known as deep structured learning or hierarchical learning) is part of a broader family of machine learning methods based on the layers used in artificial neural networks.

An artificial neural network (ANN) 1000 comprises a set of rules that are designed to execute tasks such as regression, classification, clustering, and pattern recognition. The ANNs achieve such objectives with a learning procedure, where they are shown various examples of input data, along with the desired output. With this, they learn to identify the proper output for any input within the training data manifold. Learning by using labels is called supervised learning and learning without labels is called unsupervised learning. Deep learning typically requires a large amount of input data.

A deep neural network (DNN) 1000 is an artificial neural network comprising multiple hidden layers 1002 between the input layer 1001 and the output layer 1014. Training of DNN allows it to find the correct mathematical manipulation to transform the input into the proper output even when the relationship is highly non-linear and/or complicated.

Each hidden layer 1002 comprise nodes 1004, 1006, 1008, 1010, 1012, where the computation takes place. As shown in FIG. 11, each node 1004 combines input data 1001 with a set of coefficients, or weights 1100, that either amplify or dampen that input 1001, thereby assigning significance to inputs 1001 with regard to the task the algorithm is trying to learn. The input-weight products are added 1102 and the sum is passed through an activation function 1104, to determine whether and to what extent that signal should progress further through the network 1000 to affect the ultimate outcome, such as an act of classification. In the process, the neural networks learn to recognize correlations between certain relevant features and optimal results.

In the case of classification, the output of deep-learning network 1000 may be considered as a likelihood of a particular outcome, such as in this case a probability of decoding success of a data packet. In this case, the number of layers 1002 may vary proportional to the number of used input data 1001. However, when the number of input data 1001 is high, the accuracy of the outcome 1014 is more reliable. On the other hand, when there are fewer layers 1002, the computation might take less time and thereby reduce the latency. However, this highly depends on the specific DNN architecture and/or the computational resources.

Initial weights 1100 of the model can be set in various alternative ways. During the training phase they are adapted to improve the accuracy of the process based on analyzing errors in decision making. Training a model is basically a trial and error activity. In principle, each node 1004, 1006, 1008, 1010, 1012 of the neural network 1000 makes a decision (input*weight) and then compares this decision to collected data to find out the difference to the collected data. In other words, it determines the error, based on which the weights 1100 are adjusted. Thus, the training of the model may be considered a corrective feedback loop.

Typically, a neural network model is trained using a stochastic gradient descent optimization algorithm for which the gradients are calculated using the backpropagation algorithm. The gradient descent algorithm seeks to change the weights 1100 so that the next evaluation reduces the error, meaning the optimization algorithm is navigating down the gradient (or slope) of error. It is also possible to use any other suitable optimization algorithm if it provides sufficiently accurate weights 1100. Consequently, the trained parameters of the neural network 1000 may comprise the weights 1100.

In the context of an optimization algorithm, the function used to evaluate a candidate solution (i.e. a set of weights) is referred to as the objective function. Typically, with neural networks, where the target is to minimize the error, the objective function is often referred to as a cost function or a loss function. In adjusting weights 1100, any suitable method may be used as a loss function, some examples are mean squared error (MSE), maximum likelihood (MLE), and cross entropy.

As for the activation function 1104 of the node 1004, it defines the output 1014 of that node 1004 given an input or set of inputs 1001. The node 1004 calculates a weighted sum of inputs, perhaps adds a bias and then makes a decision as "activate" or "not activate" based on a decision threshold as a binary activation or using an activation function 1104 that gives a nonlinear decision function. Any suitable activation function 1104 may be used, for example sigmoid, rectified linear unit (ReLU), normalized exponential function (softmax), sotfplus, tan h, etc. In deep learning, the activation function 1104 is usually set at the layer level and applies to all neurons in that layer. The output 1014 is then used as input for the next node and so on until a desired solution to the original problem is found.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
at least one processor; and
at least one memory storing instructions that, when executed by the at least one processor, cause the apparatus at least to perform:
hosting a plurality of applications for managing network functions of a radio access network;
scheduling the plurality of applications for one or more future time slots;
obtaining one or more predicted future values of one or more network parameters of the radio access network for the one or more future time slots;
determining whether or not at least one conflict exists in the scheduling of the plurality of applications based on the one or more predicted future values of the one or more network parameters; and
in response to determining that the at least one conflict exists, resolving the at least one conflict by adjusting scheduling of at least one application involved in the at least one conflict.

2. The apparatus of claim 1, wherein the obtaining of the one or more predicted future values of the one or more network parameters of the radio access network comprises:
maintaining, in the at least one memory, a trained machine-learning model, wherein one or more features of the trained machine-learning model comprise one or more cell and/or user parameters measurable in the radio access network, and one or more labels of the trained machine-learning model comprise the one or more network parameters of the radio access network;
obtaining one or more measured values for the one or more cell and/or user parameters; and
predicting, using the trained machine-learning model, one or more future values of the one or more network parameters for the one or more future time slots based on at least the one or more measured values of the one or more cell and/or user parameters.

3. The apparatus according to claim 2, wherein the one or more cell and/or user parameters comprise, for each of one or more terminal devices, at least parameters for defining a location of a terminal device within its serving cell and a most probable next serving cell of the terminal device.

4. The apparatus of claim 2, wherein the one or more cell and/or user parameters comprise
a cell area of a serving cell
a speed of one or more terminal devices and
at least one of
an angle of arrival from one or more terminal devices,
an angle of departure for transmission to one or more terminal device,
a beam identifier for a beam for transmission to or reception from one or more terminal devices
an antenna tilt for transmission to or reception from one or more terminal devices or
an antenna beam direction for transmission to or reception from one or more terminal devices.

5. The apparatus according to claim 2, wherein the apparatus is a near-real-time radio access network intelligent controller, near-RT RIC, of an open radio access network, O-RAN, architecture, and the plurality of applications are xApps, the at least one memory and the instructions being configured, with the at least one processor, to cause the apparatus to perform, before the maintaining:
receiving the trained machine-learning model from a non-real-time radio access network intelligent controller, non-RT RIC, of the O-RAN architecture; and
storing the trained machine-learning model to the at least one memory.

6. The apparatus according to claim 1, wherein each or at least one of the at least one conflict corresponds to a conflict between
a value of at least one parameter defined by one of the plurality of applications based on the scheduling and the one or more predicted future values of the one or more network parameters and
a value of the at least one parameter defined by another of the plurality of applications based on the scheduling and the one or more predicted future values of the one or more network parameters,
wherein the conflict is associated with at least one of the one or more future time slots.

7. The apparatus according to claim 1, wherein each or at least one of the at least one conflict is one of:
a conflict in at least one key performance indicator to be affected by at least two applications,
a conflict in at least one network configuration parameter to be set by at least two applications,
a conflict due to a logical dependency between objectives of at least two applications,
a conflict due to an execution of at least one application using outdated measurement data and at least one other application using up-to-date measurement data and
a conflict in simultaneous allocation of radio resources by at least two applications.

8. The apparatus according to claim 1, wherein each or at least one of the at least one conflict is a conflict in scheduling of at least one application of the plurality of applications resulting from a change in a radio access network topology as predicted by the one or more predicted future values of the one or more network parameters of the radio access network.

9. The apparatus according to claim 1, wherein the adjusting of the scheduling of the at least one of the plurality of applications comprises:
suspending execution of the at least one application to avoid execution of the at least one application during at least one of the at least one future time slot.

10. The apparatus according to claim 1, wherein the at least one memory and the instructions are configured, with the at least one processor, to cause the apparatus to perform:
assigning a service level agreement violation penalty associated with a performance degradation to each or at least one of the at least one application whose scheduling is adjusted.

11. The apparatus according to claim 1, wherein the at least one memory and the instructions are configured, with the at least one processor, to cause the apparatus to perform:
preventing changing of values of one or more cell and/or user parameters associated with the at least one application for at least one future time slot for avoiding further conflicts resulting from the at least one conflict.

12. The apparatus of claim 11, wherein the at least one memory and the instructions are configured, with the at least one processor, to cause the apparatus to perform:
maintaining, in the at least one memory, information on one or more nested conflict scenarios where a conflict between the plurality of applications is known to result or potentially result in further conflicts later on; and performing the preventing of the changing of values of the one or more cell and/or user parameters based on the information on the one or more nested conflict scenarios.

13. The apparatus according to claim 1, wherein the at least one memory and the instructions are configured, with the at least one processor, to cause the apparatus to perform:

maintaining, in the at least one memory, information on one or more known conflict scenarios involving any of the plurality of applications; and performing the determining whether or not the at least one conflict exists in the scheduling of the plurality of applications further based on the one or more known conflict scenarios.

14. The apparatus according to claim 1, wherein the one or more network parameters of the radio access network comprise at least one of:

number of terminal devices in a serving cell, number of terminal devices in one or more neighboring cells, a quality of service of one or more terminal devices in the serving cell, a quality of service of one or more terminal devices in one or more neighboring cells, a downlink bit rate of one or more terminal devices in the serving cell, an uplink bit rate of one or more terminal devices in the serving cell, a cell individual offset for the serving cell, a cell individual offset for one or more neighboring cells, a hysteresis associated with one or more terminal devices in the serving cell, a reference signal received power of one or more neighboring cell for one or more terminal devices, a reference signal received power of one or more serving cells for one or more terminal devices, a reference signal received quality of the one or more neighboring cells for one or more terminal devices, a reference signal received quality of the one or more serving cells for one or more terminal devices, a throughput of the serving cell, a throughput of the one or more neighboring cells, a signal-to-noise ratio for the serving cell, a signal-to-noise ratio for the one or more neighboring cells, a signal-to-interference-plus-noise ratio for the serving cell, or a signal-to-interference-plus-noise ratio for the one or more neighboring cells.

15. The apparatus according to claim 1, wherein the plurality of applications are applications for providing value-added services, and the plurality of applications comprise at least one third-party application.

16. The apparatus according to claim 1, wherein the apparatus is a near-real-time radio access network intelligent controller, near-RT RIC, of an open radio access network, O-RAN, architecture, and the plurality of applications are xApps.

17. A system comprising:

an apparatus of claim 16; and a non-RT RIC comprising at least one processor and at least one memory storing instructions that, when executed by the at least one processor, cause the non-RT RIC at least to perform:

maintaining, in the at least one memory, a training data set, wherein the training data set comprises a plurality of values of the one or more network parameters of the radio access network and a plurality of values of the one or more cell and/or user parameters of the radio access network;

initializing a machine-learning model;

training the machine-learning model using the training data set, wherein, in the training, the one or more cell and/or user parameters are features of the machine-learning model, and the one or more network parameters are labels of the machine learning model; and transmitting the trained machine-learning model to the apparatus.

18. A method comprising:

hosting a plurality of applications for managing network functions of a radio access network;

scheduling the plurality of applications for one or more future time slots;

obtaining one or more predicted future values of one or more network parameters of the radio access network for the one or more future time slots;

determining whether or not at least one conflict exists in the scheduling of the plurality of applications based on the one or more predicted future values of the one or more network parameters; and in response to determining that the at least one conflict exists, resolving the at least one conflict by adjusting scheduling of at least one application involved in the at least one conflict.

19. A non-transitory computer readable medium having stored thereon instructions that, when executed by a computing device, cause the computing device to perform:

hosting a plurality of applications for managing network functions of a radio access network;

scheduling the plurality of applications for one or more future time slots;

obtaining one or more predicted future values of one or more network parameters of the radio access network for the one or more future time slots;

determining whether or not at least one conflict exists in the scheduling of the plurality of applications based on the one or more predicted future values of the one or more network parameters; and in response to determining that the at least one conflict exists, resolving the at least one conflict by adjusting scheduling of at least one application involved in the at least one conflict.

* * * * *